United States Patent
Shi

(10) Patent No.: US 10,587,345 B2
(45) Date of Patent: Mar. 10, 2020

(54) MEASUREMENT APPARATUS OF VECTORIAL OPTICAL FIELDS

(71) Applicant: University of South Florida, Tampa, FL (US)

(72) Inventor: Zhimin Shi, Tampa, FL (US)

(73) Assignee: University of South Florida, Tampa, FL (US)

( * ) Notice: Subject to any disclaimer, the term of this patent is extended or adjusted under 35 U.S.C. 154(b) by 0 days.

(21) Appl. No.: 16/396,618

(22) Filed: Apr. 26, 2019

(65) Prior Publication Data
US 2019/0393963 A1 Dec. 26, 2019

Related U.S. Application Data

(60) Provisional application No. 62/690,114, filed on Jun. 26, 2018.

(51) Int. Cl.
*H04B 10/556* (2013.01)
*H04B 10/70* (2013.01)

(52) U.S. Cl.
CPC ........... *H04B 10/556* (2013.01); *H04B 10/70* (2013.01)

(58) Field of Classification Search
CPC .............................. H04B 10/556; H04B 10/70
See application file for complete search history.

(56) References Cited

U.S. PATENT DOCUMENTS

| | | | |
|---|---|---|---|
| 7,019,882 B1* | 3/2006 | Wilson | H04B 10/50 359/237 |
| 9,768,909 B2* | 9/2017 | Huang | H04J 14/00 |
| 10,006,859 B2* | 6/2018 | Ashrafi | G01N 33/487 |
| 2008/0019632 A1* | 1/2008 | Ishii | G02B 6/1228 385/2 |
| 2011/0243175 A1* | 10/2011 | Evans | H01S 5/1209 372/50.11 |
| 2011/0243574 A1* | 10/2011 | Essiambre | G02B 6/29311 398/200 |
| 2011/0274429 A1* | 11/2011 | Caplan | H04B 10/5561 398/65 |
| 2012/0076301 A1* | 3/2012 | Kanter | H04K 1/02 380/256 |
| 2012/0230686 A1* | 9/2012 | Tang | H04L 27/2662 398/43 |

(Continued)

OTHER PUBLICATIONS

Q. Zhan, "Cylindrical vector beams: from mathematical concepts to applications," Adv. Opt. Photon. 1, 1-57 (2009).

(Continued)

*Primary Examiner* — Mina M Shalaby
(74) *Attorney, Agent, or Firm* — Meunier Carlin & Curfman LLC

(57) ABSTRACT

An apparatus measures the transverse profile of vectorial optical field beams, including at least the directional intensity complex amplitude, the phase and the polarization spatial profile. The apparatus contains a polarization separation module, a weak perturbation module, and a detection module. Characterizing the transverse profile of vector fields provides an optical metrology tool for both fundamental studies of vectorial optical fields and a wide spectrum of applications, including microscopy, surveillance, imaging, communication, material processing, and laser trapping.

4 Claims, 15 Drawing Sheets

(56) References Cited

U.S. PATENT DOCUMENTS

| | | | | |
|---|---|---|---|---|
| 2013/0064554 A1* | 3/2013 | Li | ................... | G02B 6/02009 398/143 |
| 2015/0323781 A1* | 11/2015 | Schneider | .............. | G02B 26/06 359/238 |
| 2016/0204866 A1* | 7/2016 | Boroson | ............ | H04B 10/1121 398/97 |
| 2017/0207850 A1* | 7/2017 | Takahashi | .............. | H04B 10/60 |
| 2019/0036305 A1* | 1/2019 | Lu | ........................... | H01S 5/142 |
| 2019/0312402 A1* | 10/2019 | Lucas | ................... | H01S 3/1053 |

OTHER PUBLICATIONS

A. F. Abouraddy and K. C. Toussaint, "Three-dimensional polarization control in microscopy," Phys. Rev. Lett. 96, 153901 (2006).
Q. Zhan and J. R. Leger, "Focus shaping using cylindrical vector beams," Opt. Express 10, 324-331 (2002).
M. G. Donato, S. Vasi, R. Sayed, P. H. Jones, F. Bonaccorso, A. C. Ferrari, P. G. Gucciardi, and O. M. Maragò, "Optical trapping of nanotubes with cylindrical vector beams," Opt. Lett. 37, 3381-3383 (2012).
H. Rubinsztein-Dunlop, et al., "Roadmap on structured light," J. Opt. 19, 013001 (2017).
M. Beresna, M. Gecevicius, and P. G. Kazansky, "Polarization sensitive elements fabricated by femtosecond laser nanostructuring of glass," Opt. Mater. Express 1, 783-795 (2011).
G. Milione, T. A. Nguyen, J. Leach, D. A. Nolan, and R. R. Alfano, "Using the nonseparability of vector beams to encode information for optical communication," Opt. Lett. 40, 4887-4890 (2015).
G. Milione, M. P. J. Lavery, H. Huang, Y. Ren, G. Xie, T. A. Nguyen, E. Karimi, L. Marrucci, D. A. Nolan, R. R. Alfano, and A. E. Willner, "4×20 gbit/s mode division multiplexing over free space using vector modes and a q-plate mode (de)multiplexer," Opt. Lett. 40, 1980-1983 (2015).
Y. Zhao and J. Wang, "High-base vector beam encoding/decoding for visible-light communications," Opt. Lett. 40, 4843-4846 (2015).
A. Sit, F. Bouchard, R. Fickler, J. Gagnon-Bischoff, H. Larocque, K. Heshami, D. Elser, C. Peuntinger, K. Günthner, B. Heim, C. Marquardt, G. Leuchs, R. W. Boyd, and E. Karimi, "High-dimensional intracity quantum cryptography with structured photons," Optica 4, 1006-1010 (2017).
C. Maurer, A. Jesacher, S. Fürhapter, S. Bernet, and M. Ritsch-Marte, "Tailoring of arbitrary optical vector beams," New J Phys 9, 78 (2007).
X.-L. Wang, J. Ding, W.-J. Ni, C.-S. Guo, and H.-T. Wang, "Generation of arbitrary vector beams with a spatial light modulator and a common path interferometric arrangement," Opt. Lett. 32, 3549-3551 (2007).
L. Marrucci, C. Manzo, and D. Paparo, "Optical spin-to-orbital angular momentum conversion in inhomogeneous anisotropic media," Phys. Rev. Lett. 96, 163905 (2006).
S. Slussarenko, A. Murauski, T. Du, V. Chigrinov, L. Marrucci, and E. Santamato, "Tunable liquid crystal q-plates with arbitrary topological charge," Opt. Express 19, 4085-4090 (2011).
F. Cardano, E. Karimi, S. Slussarenko, L. Marrucci, C. de Lisio, and E. Santamato, "Polarization pattern of vector vortex beams generated by q-plates with different topological charges," Appl. Opt. 51, C1-C6 (2012).
G. Volpe and D. Petrov, "Generation of cylindrical vector beams with few-mode fibers excited by laguerre-gaussian beams," Opt. Commun. 237, 89-95 (2004).
S. Ramachandran, P. Kristensen, and M. F. Yan, "Generation and propagation of radially polarized beams in optical fibers," Opt. Lett. 34, 2525-2527 (2009).
Z. Zhao, J.Wang, S. Li, and A. E.Willner, "Metamaterials-based broadband generation of orbital angular momentum carrying vector beams," Opt. Lett. 38, 932-934 (2013).

A. Arbabi, Y. Horie, M. Bagheri, and A. Faraon, "Dielectric metasurfaces for complete control of phase and polarization with subwavelength spatial resolution and high transmission," Nat. Nanotechnol 10, 937-943 (2015).
J. S. Tyo, D. L. Goldstein, D. B. Chenault, and J. A. Shaw, "Review of passive imaging polarimetry for remote sensing applications," Appl. Opt. 45, 5453-5469 (2006).
B. Ndagano, I. Nape, B. Perez-Garcia, S. Scholes, R. I. Hernandez-Aranda, T. Konrad, M. P. Lavery, and A. Forbes, "A deterministic detector for vector vortex states," Sci. Rep. 7, 13882 (2017).
M. McLaren, T. Konrad, and A. Forbes, "Measuring the nonseparability of vector vortex beams," Phys. Rev. A 92, 023833 (2015).
R. V. Shack and B. C. Platt, "Production and use of a lenticular Hartmann screen (abstract)," J. Opt. Soc. Am. 61, 656 (1971).
R. N. Smartt and J. Strong, "Point-diffraction interferometer (abstract)," J. Opt. Soc. Am. 62, 737 (1972).
K. L. Marshall, K. Adelsberger, G. Myhre, and D. W. Griffin, "The LCPDI: A compact and robust phase-shifting point-diffraction interferometer based on dye-doped lc technology," Molecular Crystals and Liquid Crystals 454, 23/[425]-45/[447] (2006).
R. M. Neal and J. C. Wyant, "Polarization phase-shifting point diffraction interferometer," Appl. Opt. 45, 3463-3476 (2006).
J. R. Fienup, "Phase retrieval algorithms: a comparison," Appl. Opt. 21, 2758-2769 (1982).
G. Sirat and D. Psaltis, "Conoscopic holography," Opt. Lett. 10, 4-6 (1985).
K. Buse and M. Luennemann, "3d imaging: Wave front sensing utilizing a birefringent crystal," Phys. Rev. Lett. 85, 3385-3387 (2000).
R. Ragazzoni, E. Marchetti, and F. Rigaut, "Modal tomography for adaptive optics," Astron. Astrophys. 342, L53-L56 (1999).
E. Wolf, "Solution of the phase problem in the theory of structure determination of crystals from x-ray diffraction experiments," Phys. Rev. Lett. 103, 075501 (2009).
J. S. Lundeen, B. Sutherland, A. Patel, C. Stewart, and C. Bamber, "Direct measurement of the quantum wavefunction," Nature 474, 188 (2011).
J. S. Lundeen and C. Bamber, "Procedure for direct measurement of general quantum states using weak measurement," Phys. Rev. Lett. 108, 070402 (2012).
S. Wu, "State tomography via weak measurements," Sci. Rep. 3, 1193 (2013).
M. Mirhosseini, O. S. Magaña Loaiza, S. M. Hashemi Rafsanjani, and R. W. Boyd, "Compressive direct measurement of the quantum wave function," Phys. Rev. Lett. 113, 090402 (2014).
J. Z. Salvail, M. Agnew, A. S. Johnson, E. Bolduc, J. Leach, and R. W. Boyd, "Full characterization of polarization states of light via direct measurement," Nat. Photonics 7, 316-321 (2013).
M. Malik, M. Mirhosseini, M. P. Lavery, J. Leach, M. J. Padgett, and R. W. Boyd, "Direct measurement of a 27-dimensional orbital-angularmomentum state vector," Nat. Commun. 5, 3115 (2014).
Z. Shi, M. Mirhosseini, J. Margiewicz, M. Malik, F. Rivera, Z. Zhu, and R. W. Boyd, "Scan-free direct measurement of an extremely high dimensional photonic state," Optica 2, 388-392 (2015).
B. Perez-Garcia, C. López-Mariscal, R. I. Hernandez-Aranda, and J. C. Gutiérrez-Vega, "On-demand tailored vector beams," Appl. Opt. 56, 6967-6972 (2017).
J. A. Davis, D. M. Cottrell, J. Campos, M. J. Yzuel, and I. Moreno, "Encoding amplitude information onto phase-only filters," Appl. Opt. 38, 5004-5013 (1999).
V. Arrizón, U. Ruiz, R. Carrada, and L. A. González, "Pixelated phase computer holograms for the accurate encoding of scalar complex fields," J. Opt. Soc. Amer. A 24, 3500-3507 (2007).
A. M. Beckley, T. G. Brown, and M. A. Alonso, "Full poincaré beams," Opt. Express 18, 10777-10785 (2010).

* cited by examiner

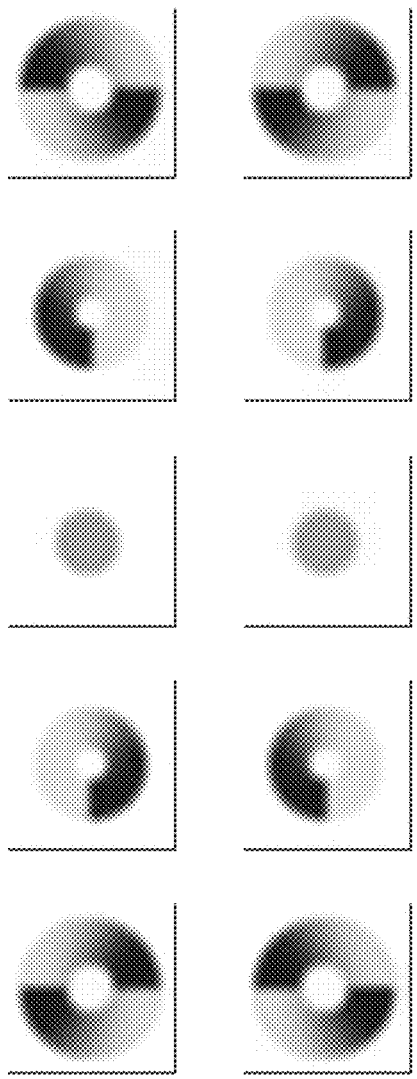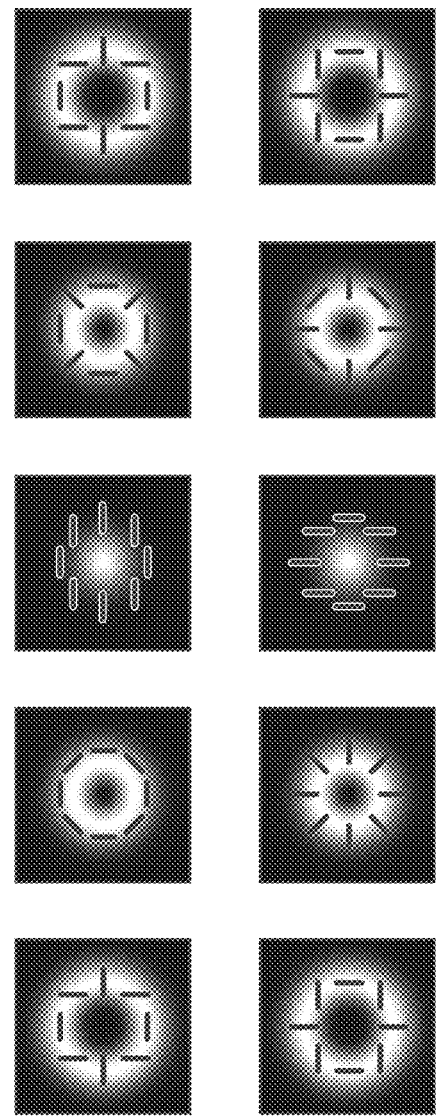

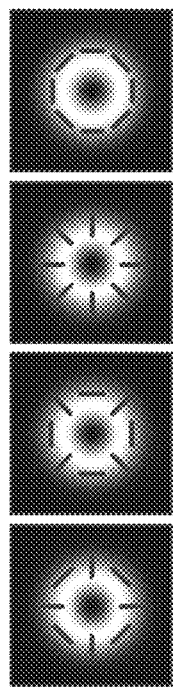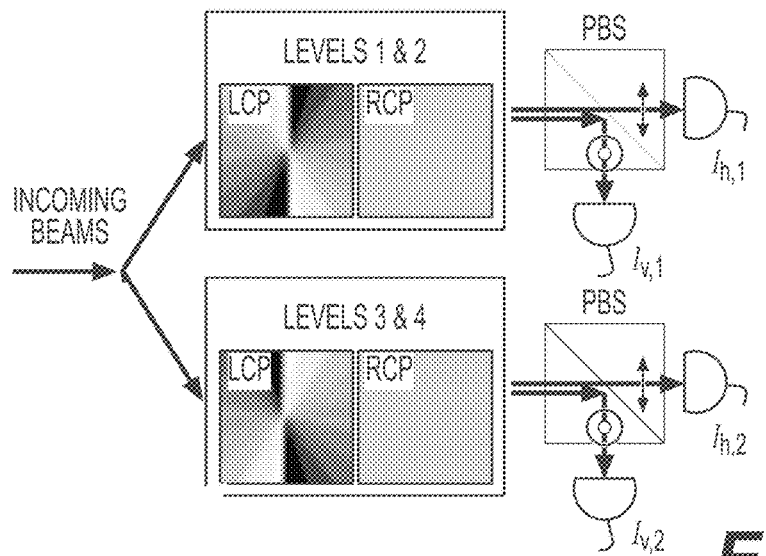
FIG. 3A
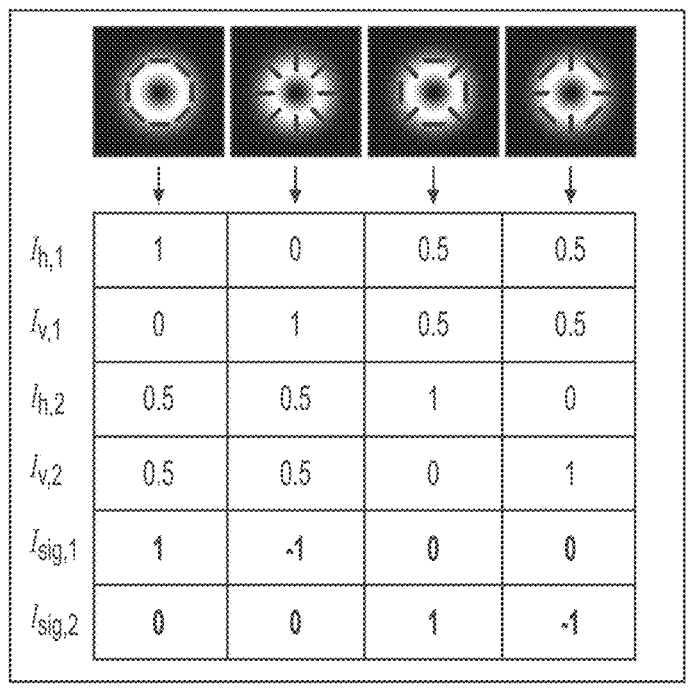
FIG. 3B

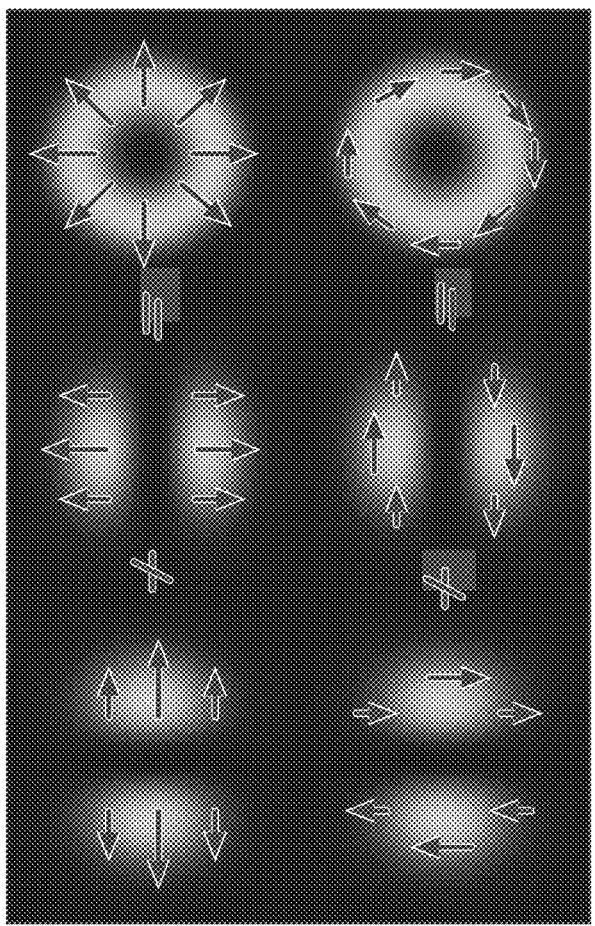
FIG. 7A
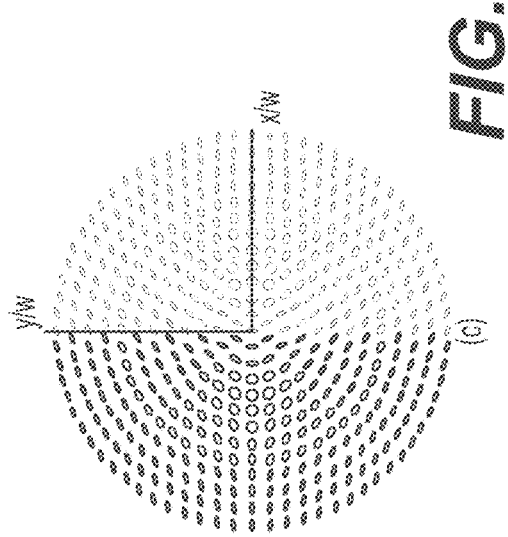
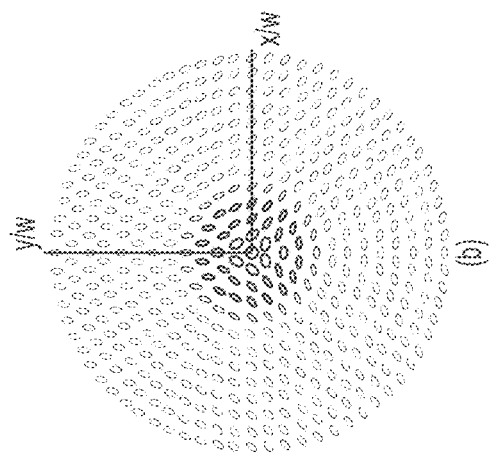
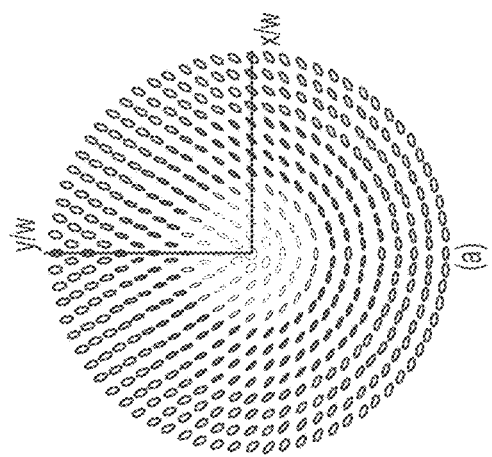
FIG. 7B

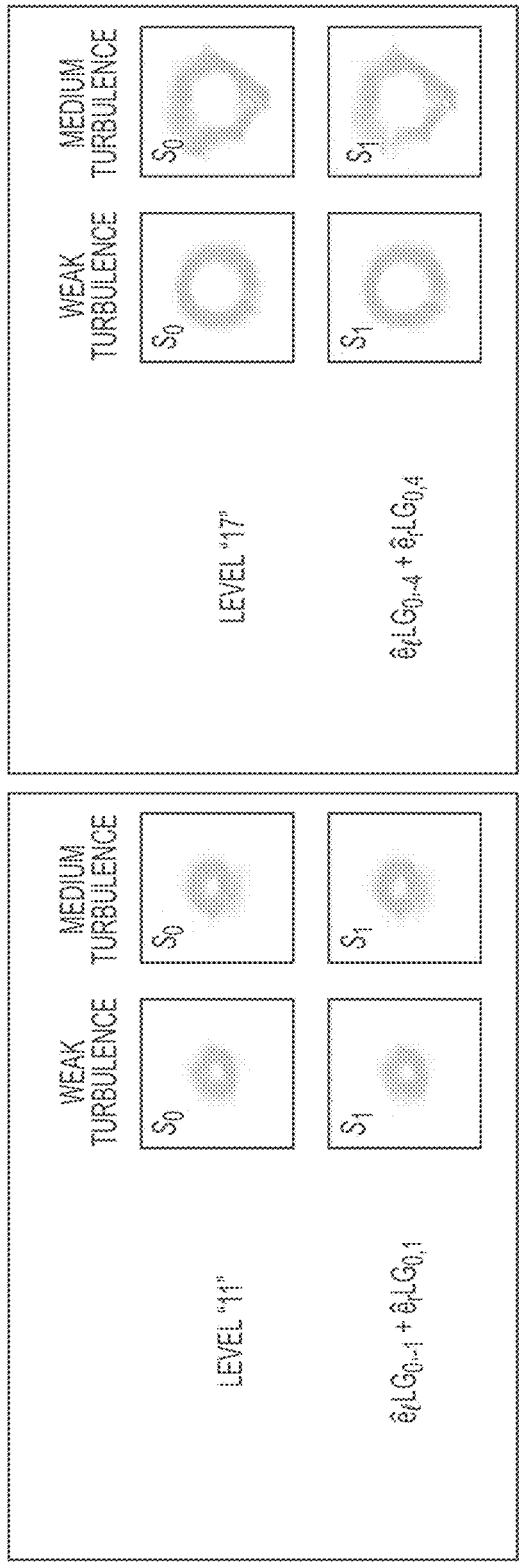
FIG. 11A
FIG. 11C
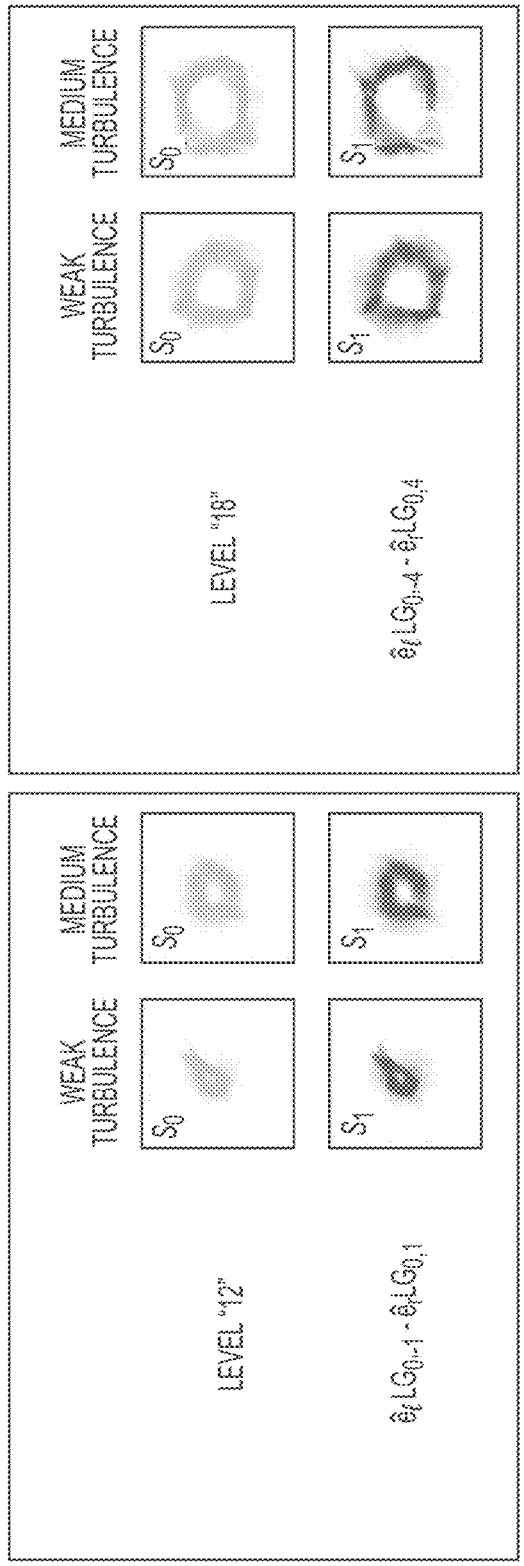
FIG. 11B
FIG. 11D

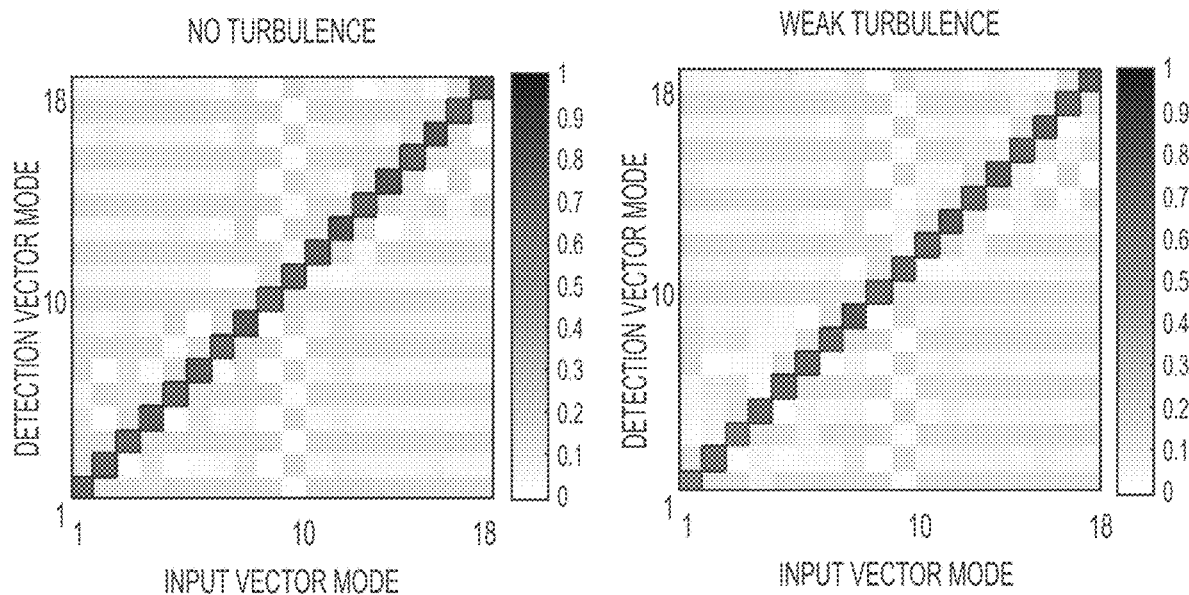
FIG. 12A
FIG. 12B
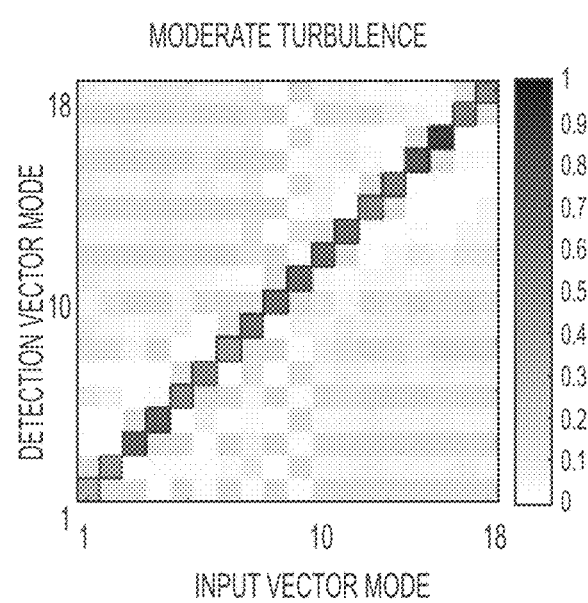
FIG. 12C

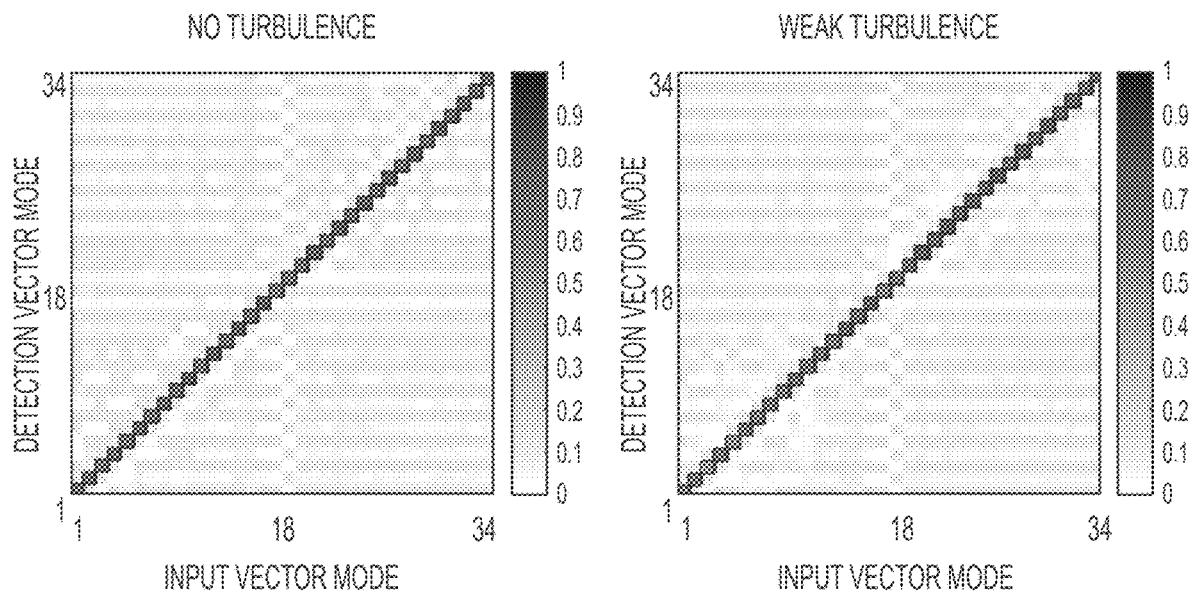
FIG. 15A  FIG. 15B
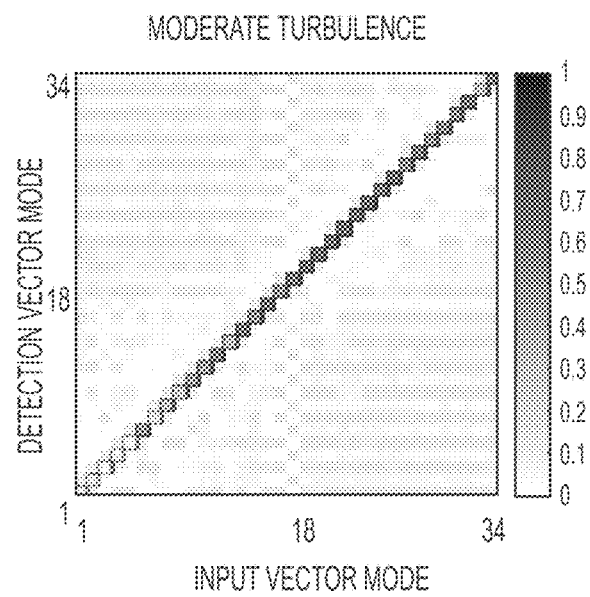
FIG. 15C

MEASUREMENT APPARATUS OF VECTORIAL OPTICAL FIELDS

CROSS REFERENCE TO RELATED APPLICATIONS

This application claims priority to and incorporates entirely by reference U.S. Provisional Patent Application Ser. No. 62/690,114 filed on Jun. 26, 2018.

STATEMENT REGARDING FEDERALLY SPONSORED RESEARCH

This invention was made with government support under Grant No. N00014-17-1-2443, awarded by the Office of Naval Research. The Government has certain rights in the invention.

FIELD

The disclosure generally relates to methods and systems implementing encoded communication protocols that utilize vectorial optical fields as the information carrier.

BACKGROUND

This disclosure explains systems and methods of using phase differences in optical signals to encode data that can be subject to accurate decoding at a receiving end. Earlier technologies for this kind of work include differential phase shift keying protocols that detect changes in phase to transfer a bit of information. Quadrature differential phase shift keying (4-DPSK) is similar but uses one symbol to transfer two bits of information.

The embodiments provided herein address two challenges in optical communication. One is how to increase the photon efficiency or information density on an optical link. The second challenge is how to carry information through turbid media without data degradation.

SUMMARY

This disclosure describes two communication protocols that utilize vectorial optical fields as the information carrier. For high-dimensional communication, the information is directly encoded as different vectorial modes, and is decoded by using specific differential spatial phase decoders. For multiplexed operation, each channel uses one vectorial mode, and the information are sent through different modes simultaneously. These protocols have high photon efficiency by utilizing the vectorial mode degree of freedom of light, and the protocols are robust against propagating through turbid media.

The spatial polarization profile of a vector beam is much better retained through turbulence upon implementing efficient encoding and decoding methods. In one embodiment, this disclosure utilizes vector-scalar beam conversion for decoding operations.

In another embodiment, the disclosure is characterized as a high dimension communication protocol for optical signals using vector beams In another embodiment, the disclosure describes an apparatus that can measure the transverse profile of vectorial optical fields (beams), including both the phase and the polarization spatial profile. The apparatus contains a polarization separation module, a weak perturbation module, and a detection module. The unique capability of fully characterizing the transverse profile of vector fields can provide a powerful optical metrology tool for both fundamental studies of vectorial optical fields and a wide spectrum of applications, including microscopy, surveillance, imaging, communication, material processing, laser trapping, and the like.

BRIEF DESCRIPTION OF THE DRAWINGS

The accompanying drawings, which are in and constitute a part of this specification, illustrate certain examples of the present disclosure and together with the description, serve to explain, without limitation, the principles of the disclosure. Like numbers represent the same element(s) throughout the figures.

FIG. 1A is a schematic representation of data (information) encoded on vector vortex modes having left and right circular polarization.

FIG. 1B is a schematic representation of discrete phase changes in data (information) encoded on vector vortex modes having left and right circular polarization as shown in FIG. 1A.

FIG. 3A is a schematic representation of the encoding and decoding process applied in higher dimensionality data.

FIG. 3B is a tabular representation of decoded outputs applied to higher dimensionality input data shown in FIG. 3A.

FIG. 7A is a schematic diagram showing additive radial and azimuthal vector beams according to this disclosure FIG. 7B is a schematic diagram showing full Poincare beams according to this disclosure.

FIG. 11A is a schematic representation of higher order dimensions of encoding at Level 11 DSPSK according to this disclosure.

FIG. 11B is a schematic representation of higher order dimensions of encoding at Level 17 DSPSK according to this disclosure.

FIG. 11C is a schematic representation of higher order dimensions of encoding at Level 12 DSPSK according to this disclosure.

FIG. 11D is a schematic representation of higher order dimensions of encoding at Level 18 DSPSK according to this disclosure.

FIG. 12A is a schematic representation of a vector beam with a DSPSK scheme of encoding in zero turbulence according to this disclosure.

FIG. 12B is a schematic representation of a vector beam with a DSPSK scheme of encoding in weak turbulence according to this disclosure.

FIG. 12C is a schematic representation of a vector beam with a DSPSK scheme of encoding in moderate turbulence according to this disclosure.

FIG. 15A is a schematic representation of a vector beam with a asymmetrical DSPSK scheme of encoding in no turbulence according to this disclosure.

FIG. 15B is a schematic representation of a vector beam with a asymmetrical DSPSK scheme of encoding in weak turbulence according to this disclosure.

FIG. 15C is a schematic representation of a vector beam with a asymmetrical DSPSK scheme of encoding in moderate turbulence according to this disclosure.

DETAILED DESCRIPTION

Figure 2:
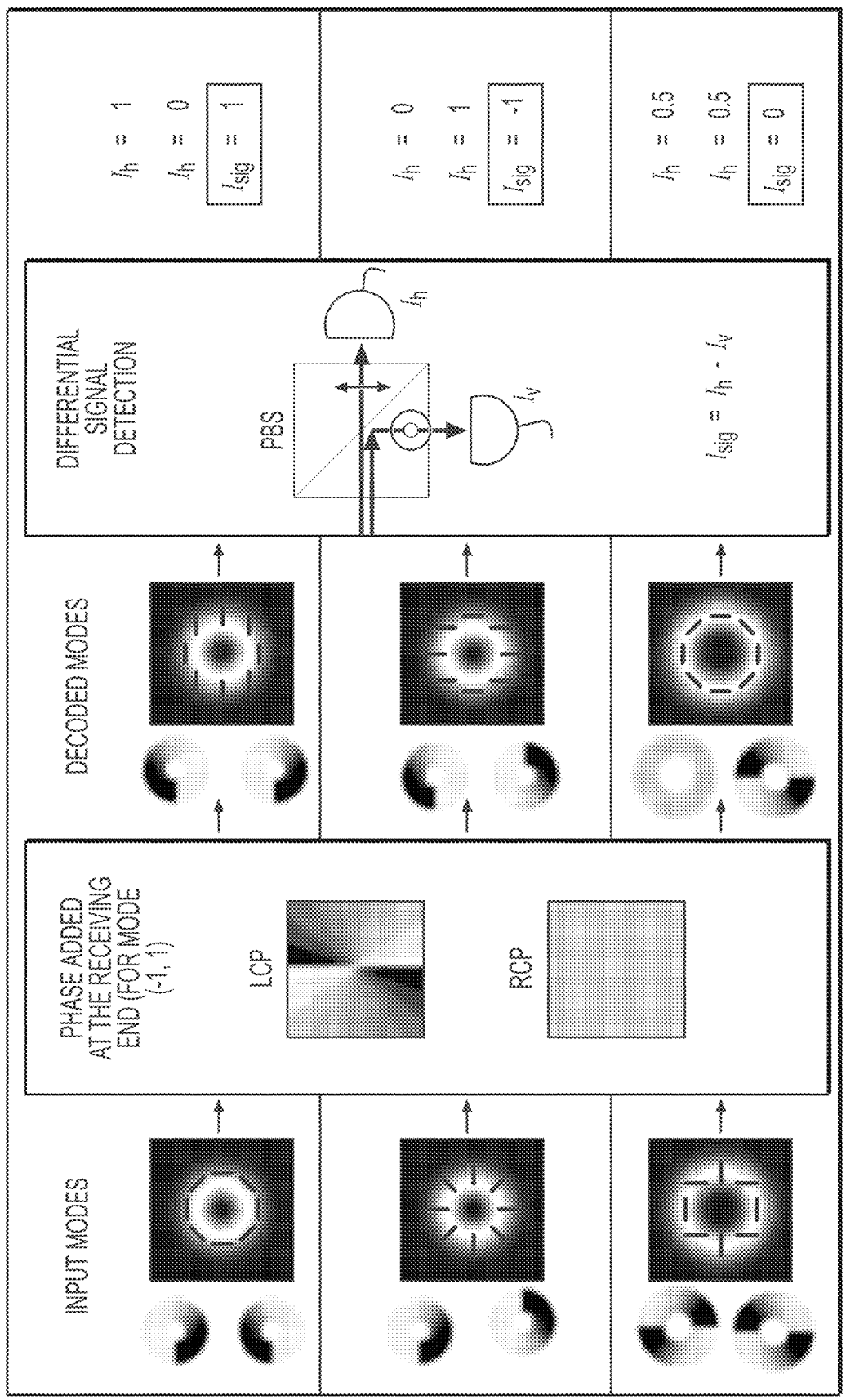
FIG. 2 is a schematic representation of the encoding and decoding process applied to the data of FIGS. 1A and 1B.

The following description of the disclosure is provided as an enabling teaching of the disclosure in its best, currently known embodiment(s). To this end, those skilled in the relevant art will recognize and appreciate that many changes can be made to the various embodiments of the invention described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

Terminology

Vector modes disclosed herein are optical beams that have complex transverse polarization and phase profiles, including but not limited to radial and azimuthal vector beams and full Poincare beams.

Unless defined otherwise, all technical and scientific terms used herein have the same meaning as commonly understood to one of ordinary skill in the art to which this invention belongs.

As used in the specification and claims, the singular form "a," "an," and "the" include plural references unless the context clearly dictates otherwise. For example, the term "an agent" includes a plurality of agents, including mixtures thereof.

As used herein, the terms "can," "may," "optionally," "can optionally," and "may optionally" are used interchangeably and are meant to include cases in which the condition occurs as well as cases in which the condition does not occur. Thus, for example, the statement that a formulation "may include an excipient" is meant to include cases in which the formulation includes an excipient as well as cases in which the formulation does not include an excipient.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed.

Publications cited herein are hereby specifically by reference in their entireties and at least for the material for which they are cited.

For spatial polarization profiles, such as vector modes of communication described herein, information may be modeled as being carried by the relative phase between two orthogonally-polarized components. The phase difference is spatially varying and can span multiple dimensions. Taking advantage of the phase difference for information transmission involves encoding the information with vector vortex modes and then decoding the information by applying polarization-dependent, spatially varying phase masks before interferometric detection.

Information carried by light may be characterized as either transmitting data in one dimensional space, two-dimensional space, or even higher dimensionality. In one dimensional space, the light signal is essentially on and off to provide respective single bits of information. In two-dimensional space, the optical signals have complex amplitudes and are not orthogonal. As the dimensionality increases, the states of photons in the light are not orthogonal, requiring a balance between efficiency in encoding and transmission and accuracy in decoding. In this disclosure, the examples utilize vector modes with optical beams having complicated and multi-faceted transverse polarization and phase profiles (i.e., vector beams). The vector beams may incorporate radial vectors, azimuthal vectors, and/or full Poincare vector beams as illustrated in FIGS. 7A and 7B.

This disclosure utilizes a vector beam basis for light encoding and shows how the phase shift of left and right circularly polarized light is detectable for decoding. The encoding and decoding process illustrates that input optical signals are encoded according to phase for decoding at an opposite end via a polarizing beam splitter for phase shift detection. The disclosure utilizes directly measured real and imaginary parts of the left- and right-handed circular polarization components of a vector beam that has uniform amplitude over a circular aperture and Zernike polynomial $Z2/4$ and $Z-2/2$ phase profiles. These vector vortex beams are comprised of $LG0,1$ and $LG0,-1$ Laguerre-Gaussian beams as the polarization components and with different phase difference between the two polarization components.

Vector beams [1], characterized by their spatially-varying polarization states, have garnered tremendous popularity recently due to their potential applications in optical microscopy [2, 3], optical tweezers [4], optical metrology [5], laser material processing [6], and optical communication [7-10]. Over the past few years, many methods have been investigated to generate vector beams using e.g., spatial light modulators (SLM) [11, 12], Q-plates [13-15], optical fibers [16, 17], and metamaterials [18, 19].

To date, most studies have characterized vector beams using imaging polarimetry [20], where intensity images are obtained of the beam after passing through polarization filtering. While such a method conveniently reveals the spatial polarization profile of vector beams, it does not provide any information about the relative phase between the fields at any two points across the beam. Some methods have characterized vector beams composed of a limited number of selected spatial polarization modes [21, 22], but since the limited number of modes typically do not span a complete mode basis set, these methods are also incapable of fully describing the transverse profile of a vector beam. There are numerous techniques that can measure the transverse phase profile of scalar beams, which include shear interferometry[23], Shack-Hartmann microlens array [24, 25], point diffraction interferometry [26-28], phase-shifting interferometry [23], phase retrieval [29], conoscopic holography [30, 31], tomographic imaging [32], and coherence measurements [33]. However, these available phase measurement techniques are all designed for scalar beams and cannot be revealed the polarization profile of vector beams.

From an information retrieval point of view, both the transverse polarization and phase profile of a vector beam carry information, and therefore a characterization method that can reveal information encoded in all the degrees of freedom available in a vector beam is naturally desired. Furthermore, in many applications, including imaging and communication, a vector beam typically needs to propagate through an optical system or interact with various optical elements. With the knowledge of both polarization and phase profiles, one can predict the evolution of vector beams upon propagating through an optical system or even free space. With the current surge of fundamental studies and applications, there is a huge demand for the development of a high-efficiency characterization method with the capability to fully characterize vector beams.

This disclosure shows a direct measurement method that is capable of measuring the complete transverse spatial profile of both polarization and complex-amplitude of a fully-polarized vector beam in a single shot. The term "direct measurement" was first introduced in the context of quantum state metrology [34]. It refers to metrology protocols in which the measurement readouts directly correspond to the complex-valued state vector or other quantities that describe the quantum system to be measured [35-40]. Compared to conventional quantum state tomography, direct measurement offers an alternative metrology technique that can greatly reduce the experimental complexity involved in characterizing a high-dimensional quantum system. The embodiments of this disclosure show a direct measurement protocol by experimentally generating and characterizing various vector beams, including vector vortex beams and full Poincaré beams that are often used in applications. The unique single-shot, full characterization capability of the method provides a powerful real-time metrology tool that can boost fundamental studies of vector optical fields as well as a wide spectrum of applications of vector beams.

While various direct measurement protocols have been developed in quantum mechanical language, most of them can be described and understood equally well in the classical picture. Thus, the direct measurement protocol herein uses physical optics terminology. A spatially-coherent vector beam can be described by the superposition of two scalar beams with orthogonal polarizations. In the circular polarization basis, for example, the transverse vectorial field profile E(u, v) at the initial (u, v) plane can be written as follows:

$$\vec{E}(u,v) = \hat{e}lEl(u,v) + \hat{e}rEr(u,v), \quad (1)$$

where el and er denote the unit vectors in the left- and right circular polarization (LCP and RCP) basis, respectively, and El(u, v) and Er(u, v) denote the transverse complex-amplitude profile of the two circular polarization components, respectively. In order to fully characterize the transverse profile of a vector beam defined by Eq. (1), one must first introduce a relative transverse shift 2du between the two polarization components of the vector beam. Here the value of du is chosen to be slightly larger than the radius of the beam such that the two polarization components are non-overlapping. At the same time, adjusting the polarization of the two components into the same horizontal linear polarization state is necessary. Since the total beam now has two spatially-separated parts, referred to as the "twin-beam". The field profile of the twin-beam ex Es (u, v), after such polarization separation and adjustment can be written as follows:

$$\hat{e}xEs(u,v) = \hat{e}x[El(u+\delta u,v)Er(u-\delta u,v)]. \quad (2)$$

Since the twin-beam has now become a spatially-coherent scalar beam of a single polarization, one may apply the recently developed scan-free direct measurement technique [40] to characterize its total transverse beam profile. Specifically, the experimental apparatus is based on a 4-f imaging system, where f is the focal length of the lenses. For a twin-beam exEs(u, v) at the input plane of the 4-f system, the field at the focal plane between the two lenses is the Fourier transform of Es(u, v) as follows:

$$\vec{Ep}(zeta,eta) = (\hat{e}xEp(zeta,eta)) = \hat{e}xF\{Es(u,v)\}, \quad (3)$$

where the variables denote the transverse coordinates on the focal plane. A weak perturbation, in the form of a small polarization rotation of angle a, is applied to the field over a diffraction limited area in the vicinity of the center of Ep (x, h). After such a weak polarization perturbation, the total field exiting the focal plane has two polarization components, which can be expressed as:

$$\vec{E}'p(zeta,eta) = (\hat{e}xEp(zeta,eta))[1+(\cos \alpha-1)\delta(zeta-zeta0,eta-eta0)] + \hat{e}yEp(zeta,eta)[\sin \alpha\delta(zeta-zeta0,eta-eta0)] \approx \hat{e}xE_p(zeta,eta) + \hat{e}y\alpha Ep(zeta,eta)\delta(zeta-zeta0,eta-eta0). \quad (4)$$

where a is the angle of polarization rotation and d(x−x0, h−h0) is Dirac delta function centered at (x0, h0). One sees that when the angle of polarization rotation a is sufficiently small, the x-polarized component at the Fourier plane can be approximated as the original unperturbed field Ep(x, h), and the generated y-polarized field is essentially a point source located at (x0, h0).

The field at the image (x, y) plane of the 4-f system is the Fourier transform of the weakly-perturbed field at the focal plane, can be further converted to the horizontal and vertical (H and V) polarization components into RCP and LCP, respectively. The final detected field can be written as follows:

$$\vec{E}'det(x,y) = (\hat{e}lF\{Ep(zeta,eta)\} + \hat{e}rF\{\alpha Ep(zeta,eta)\delta(zeta-zeta0,eta-eta0)\}) \approx \hat{e}lE's(x,y) + \hat{e}r \, Eref(x,y). \quad (5)$$

where E's (x, y)=Es (−x,−y) is the flipped version of the twin-beam, and Eref (x, y)=B exp (i2p(x0x+h0y)/1f) is an orthogonally-polarized reference field generated through the weak polarization perturbation process, and is essentially a plane wave of constant amplitude B and a well-defined linear phase profile.

One sees that the polarization state of the detected field varies across the transverse (x, y) detection plane, which can be expressed in terms of Stokes parameters as follows:

$$S1,det(x,y)=Ih,det(x,y)-Iv,det(x,y), \quad (6)$$

$$S2,det(x,y)=Id,det(x,y)-Ia,det(x,y), \quad (7)$$

where Ih, Iv, Id and Ia are the intensity profile of the field component in the horizontal, vertical, diagonal and anti-diagonal linear polarization states, respectively, and are given by $$I_{h,det}=\tfrac{1}{2}|E's|^2+\tfrac{1}{2}|Eref|^2+R\{E's,E^*ref\}, \quad (8)$$

$$I_{v,det}=\tfrac{1}{2}|E's|^2+\tfrac{1}{2}|Eref|^2-R\{E's,E^*ref\}, \quad (9)$$

$$I_{d,det}=\tfrac{1}{2}|E's|^2+\tfrac{1}{2}|Eref|^2-I\{E's,E^*ref\}, \quad (10)$$

$$I_{a,det}=\tfrac{1}{2}|E's|^2+\tfrac{1}{2}|Eref|^2+I\{E's,E^*ref\}. \quad (11)$$

R(x) and I(x) denote the real and imaginary parts of the complex quantity x, respectively. Here, the spatial dependence of all the quantities are not explicitly shown for simplicity. Using these results, one can obtain the following relation between the Stokes parameters and the transverse field profile of the twin-beam, E's:

$$S1,det(x,y)=2R\{E's(x,y)E^*ref(x,y)\},$$

$$S2,det(x,y)=-2I\{E's(x,y)E^*ref(x,y)\}. \quad (12)$$

The transverse complex amplitude profile of the twin-beam is therefore given by $$\frac{E's(x,y) = S_1, det(x,y) - iS_2, det(x,y)}{2E^*ref(x,y)} \quad (13)$$

The above expression shows that after the weak polarization perturbation, the polarization state of the final detected field, expressed in the linear basis, is directly proportional to the real and imaginary part, respectively, of the transverse complex amplitude profile of the twin-beam. According to Eq. (2), the left and right parts of the field profile of the twin-beam Es(u, v) after coordinate flipping is exactly the transverse profile of the two polarization components, El(u, v) and Er(u, v), respectively, of the vector beam to be measured. Furthermore, since the two polarization components are measured simultaneously, the relative phase information between them is retained, which is essential for revealing its polarization profile. The Stokes parameters of the vector beam under test can then be obtained through the following relations:

$$S0(u,v)=|El(u,v)|^2+|Er(u,v)|^2 \quad (14)$$

$$S1(u,v)=2R\{E^*l(u,v)Er(u,v)\} \quad (15)$$

$$S2(u,v)=-2I\{E^*l(u,v)Er(u,v)\} \quad (16)$$

$$S3(u,v)=|El(u,v)|^2-|Er(u,v)|^2 \quad (17)$$

To demonstrate a direct measurement protocol for vector beams, this disclosures describes constructing an experimental set up which includes both a vector beam generation module and a direct measurement characterization module. The method for generating the vector beam is adapted from [41]. A beam from a 532-nm laser (Coherent Compass M315) with horizontal polarization is expanded and launched onto a spatial light modulator (SLM-1; Cambridge Correlaters SDE1024). In one non-limiting embodiment, a computer-generated hologram (CGH) is imprinted on SLM-1, and the diffracted light passes through a 4-f imaging system with spatial filtering at the focal plane. Such a setup can generate a field with any desired spatial profile with a high degree of control [42, 43] at the output of the 4-f system. Here the system sets the desired spatial field to be two transversely separated coherent beams, corresponding to the LCP and RCP components of the desired vector beam. A Sagnac interferometer is placed between the second lens and the image plane of the generation 4-f system, which is composed of a polarizing beam splitter (PBS) and two mirrors. Before the twin-beam enters the Sagnac interferometer, its polarization is adjusted to 45° using a polarizer. As the twin beam enters the Sagnac interferometer, it is split by the PBS into horizontally- and vertically-polarized components which then pass through the interferometer in opposite directions. The Sagnac interferometer is adjusted such that the two polarization components experience a transverse shift at the output. Specifically, the left side of the H-polarized output overlaps with the right side of the V-polarized output. A quarter wave plate (QWP) is used to convert the H- and V-polarized components into LCP and RCP components, respectively. An iris is then used to only allow the generated vector beam to pass. As a result, the vector beam produced by the generation module has its two circular polarization components determined by the left and right part of the CGH on SLM-1, respectively. The direct measurement module is also built based on a 4-f imaging system, whose object plane overlaps with the output image plane of the beam generation module. A second Sagnac interferometer is inserted before the first lens to transform the vector beam into a twin-beam with a transverse shift of 2du between the horizontal and vertical polarization components. When a QWP is used before the Sagnac interferometer, the vector beam characterization is effectively performed in the circular-polarization basis. When this QWP is absent, the beam characterization is performed in the horizontal and vertical linear polarization basis. A polarizer is placed after the Sagnac interferometer to set the twin-beam uniformly polarized in the diagonal direction. A phase-only SLM (SLM-2; Hamamatsu X10468) is placed at the focal plane of the characterization 4-f system to perform the weak polarization perturbation. SLM-2 only responds to horizontally-polarized light, and is operating in the reflection mode. The birefringent response of SLM-2 effectively alters the polarization of the reflected light. The phase on SLM-2 is set to zero everywhere except for a small area near the center of the focused beam, which is given a non-zero phase value. The size of the small area (80 μm by 80 μm) is comparable to the diffraction-limited spot size, and therefore the generated anti-diagonally-polarized reference field at the detection plane can be expressed analytically. A polarization-resolving camera (4D Technology PolarCam) is placed at the detection plane with a QWP in front of it. The QWP converts the diagonally and anti-diagonally polarized signal and reference fields into left- and right-handed circular polarizations, respectively.

The camera includes a micro-polarizer array that contains a pattern of linear polarizers (oriented at 0°, 45°, 90°, and 135°), capable of resolving Ih, Iv, Id, and Ia (i.e., the irradiance at horizontal, vertical, diagonal, and anti-diagonal). Since all four polarizations can be measured simultaneously, the direct measurement of a vector beam can be performed in a single shot. Note that the polarization-resolving camera can be replaced by a combination of beam splitters, polarization optics and a regular camera [40].

To demonstrate the capability of a direct measurement protocol, testing a variety of vector beams includes several that are commonly used in applications. First, the test generates a vector beam that has uniform amplitude over a circular aperture and Zernike polynomial phase profiles, Z2/4 and Z-2/2, encoded into the LCP and RCP components, respectively. The directly-measured real and imaginary parts of the two circular polarization components are shown in FIGS. 2(a)-(d). The corresponding phase profile of the two components as well as the profiles of three normalized Stokes parameters, are shown in FIGS. 2(e)-(i), respectively. One sees that experimental results match well with the theoretical expectations, shown as insets in the upper-right corner of each figure. To quantitatively evaluate direct measurement results, the beam fidelity is used as a figure of merit, which is defined as follows:

$$F \equiv \frac{\left| \sum_p \int E_p, \exp(x, y) E_p^*, \text{the } (x, y) dx dy \right|}{\sqrt{\sum_p \int |E_p, \exp(x, y)|^2 dx dy} \sqrt{\sum_p \int |E_p, \exp(x, y)|^2 dx dy}} \quad (18)$$

where the subscript p denotes the polarization components for the chosen basis, and Ep,exp and Ep,the denote the experimental results and theoretical predictions, respectively. The fidelity of the circular vector beam with uniform amplitude and Zernike polynomial phase profiles are calculated to be approximately 0.95, and similar high fidelity is observed for a variety of tested vector beams with different Zernike phase profiles. The high fidelity of our results demonstrates that our technique is capable of accurately measuring the complex field profiles as well as the polarization profile of vector beams. The resolution of our experimental result is approximately 100,000 pixels, which is limited by the numerical aperture of the imaging system and by the total pixel count of the camera used in the experiment.

Second, measuring a family of four vector vortex beams [1] that have been used for high-dimensional secure quantum communication [7, 8, 10] is completed. These four vector vortex beams use LG0,1 and LG0,-1 Laguerre-Gaussian (LG) modes as the two circular polarization components with an additional 0 or p phase difference between the two polarization components. Here LGp,1 denotes the Laguerre-Gaussian mode with radial index p and azimuthal index 1. As a result, these four vector beams have the same intensity profile but very different spatial polarization profiles. Since these four vector modes are orthogonal to each other, they can be used to represent 2 bits of information in a spatial-mode-encoding protocol. Direct measurement techniques herein reveal the azimuthal phase profile of each LG mode as well as the donut-shaped amplitude profile (illustrated by the saturation of each plots). Moreover, mode 1 and mode 2 (same for mode 3 and mode 4) have identical transverse phase profiles for the LCP component, while the two RCP components have the same spiral phase structure, but have an additional "0" and "p" phase difference with respect to the LCP component, respectively. This relative phase difference determines that mode 1 is radially polarized and mode 2 is azimuthally polarized. The direct measurement method correctly measures the relative phase difference between the two polarization components for each mode, which can lead to the correct spatial profile of Stokes parameters. This would not have been possible if the complex field profiles of the two polarization components are measured separately.

In some embodiments, this disclosure characterizes this vector vortex beam in the circular polarization bases. Measurements reveal correctly the amplitude and the phase of the LG0,1 and LG0,-1 modes in the circular polarization bases with the correct relative phase difference, which leads to the expected Stokes parameter profiles as well. A radially-polarized beam can also be constructed by the superposition of HG1,0 and HG0,1 Hermite-Gaussian (HG) modes in the linear polarization basis [44]. When removing the quarter wave plate ("QWP") at the very front of the characterization module, one can measure the radially-polarized beam in the H-V polarization basis.

Finally, in some embodiments, this disclosure demonstrates the generation and characterization of a full Poincaré beam, which has attracted a lot of research interest for its richness in fundamental physics as well as its potential applications in imaging and particle tracking [45]. A full-Poincaré beam is generated by superposing an LCP fundamental Gaussian mode and an RCP LG0,1 Laguerre-Gaussian mode.

FIGS. 1A and 1B illustrate an example of the vector beam basis for light encoding and shows how the phase shift of left and right circularly polarized light is detectable for decoding. Information is encoded on these vector vortex modes characterized by $$\hat{e}_l LG_{0,m} +/- \hat{e}_r LG_{0,-m}$$

The encoding and decoding process as shown in FIG. 2 illustrates that input optical signals are encoded according to phase for decoding at an opposite end via a polarizing beam splitter for phase shift detection. For high-dimensional communication, the information is directly encoded as different vectorial modes, and is decoded by using specific differential spatial phase decoders. As illustrated in FIG. 3A, the encoding levels can increase in dimensionality, forming the decoding array as as shown in FIG. 3B.

Figure 4A:
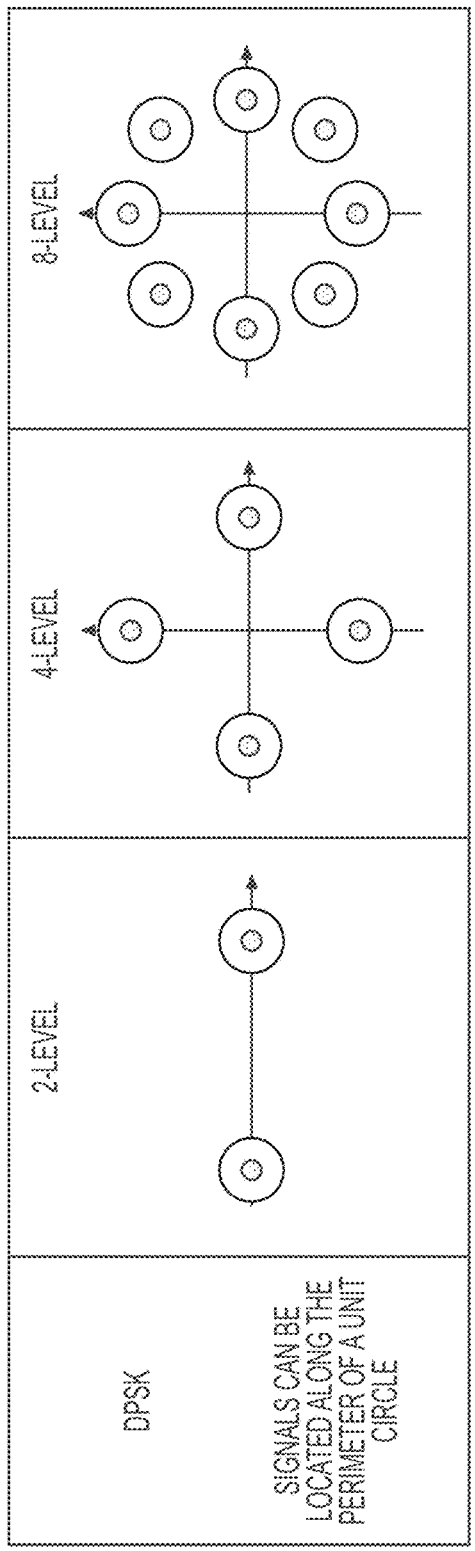
FIG. 4A is a schematic representation of Differential Phase Shift Keying using vector vortex analysis according to this disclosure.
Figure 4B:
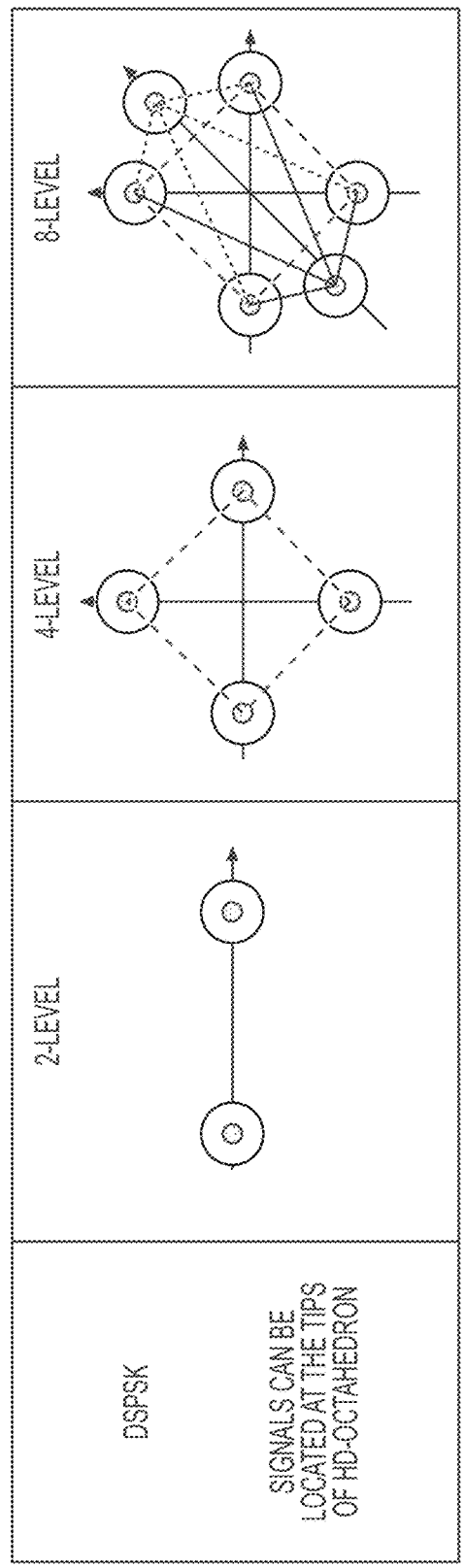
FIG. 4B is a schematic representation of Differential Spatial Phase Shift Keying using vector vortex analysis according to this disclosure.

Using the vectorial method of optical encoding allows for the optical signal to be modeled in accordance with FIG. 4A for differential phase shift keying in which signals can be located along the circumference of a unit circle. In FIG. 4B the differential spatial phase shift keying of this disclosure illustrates that higher levels of encoding data in various spatial directions is possible, such as the data being illustrated at tips of a high dimension octahedron as shown. For multiplexed operation, each channel uses one vectorial mode, and the information are sent through different modes simultaneously. These protocols have high photon efficiency by utilizing the vectorial mode degree of freedom of light, and the protocols are robust against propagating through turbid media.

Figure 5:
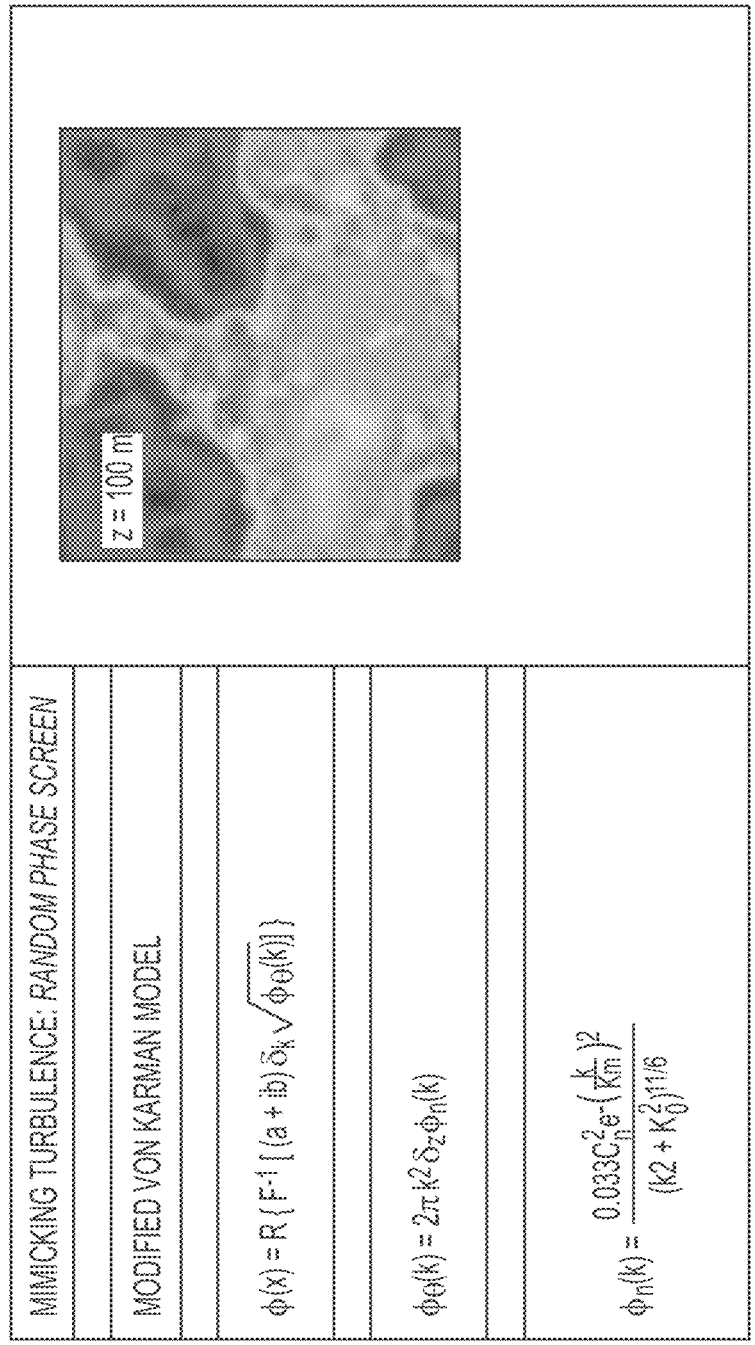
FIG. 5 is an image of an optical signal subject to mimicked turbulence applied as a random phase screen.
Figure 6B:
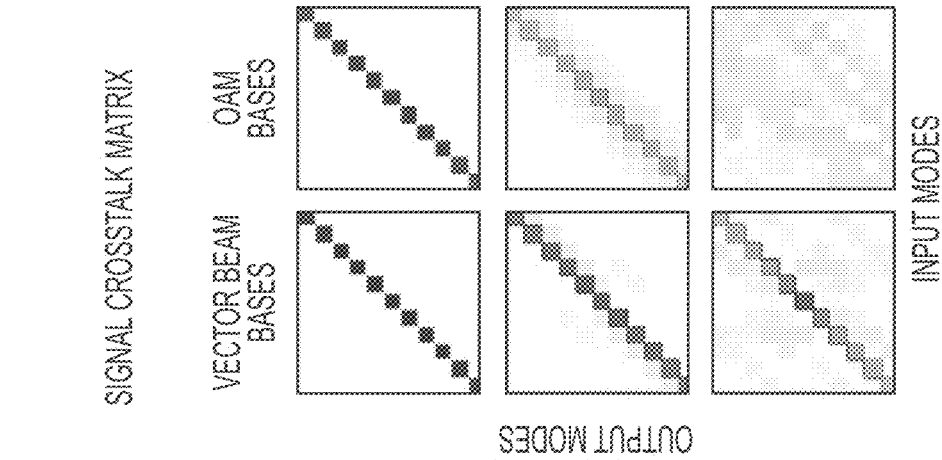
FIG. 6B is a signal cross talk matrix of outputs from the corresponding beams of FIG. 6A.
Figure 6A:
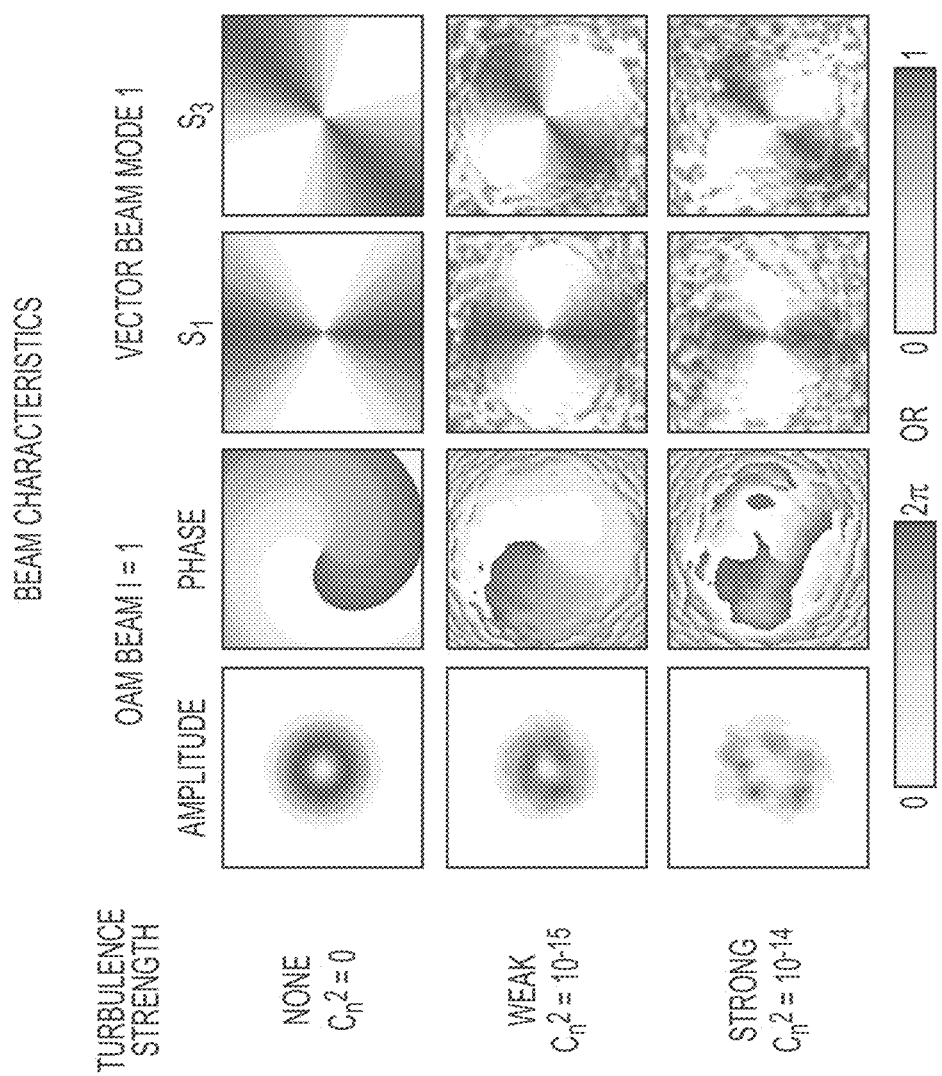
FIG. 6A is a series of optical images showing beam characteristics for an optical signal propagated through varied turbulence strength for given orbital angular momentum (OAM) and vector beam modes.

One significant aspect of the work set forth herein lies in the use of a random phase screen to mimic turbulence through which an optical signal must traverse for decoding. FIG. 5 illustrates one non-limiting embodiment in which a modified von Karman model is used for the turbulence screen. FIG. 6A shows the successful results of decoding according to vector beam bases as set forth herein as compared to orbital angular momentum bases as well. FIG. 6B is a strong proof of concept, accordingly.

Examples

In certain examples discussed below, a turbulence characterization includes using a circular optical beam of uniform amplitude and measuring a phase profile with a reference planewave. An orbital angular momentum ("OAM") communication scheme is set up and the resulting optical images show that even weak turbulence significantly deteriorates the phase structure for decoding purposes. The OAM coding result shows considerable deterioration even in the presence of simply weak turbulence. In OAM encoding, each representation level corresponds to a beam with a specific orbital angular momentum (−2, −1, 0, 1, 2). This disclosure and the examples shared below propose a high-dimensional communication protocol differential spatial phase shift keying (DSPSK) using vector beams so that the communication is resistant to moderate and atmospheric turbulence and can operate without adaptive optics modules.

By contrast, using vector beams as illustrated in FIGS. 7A and 7B for the optical modeling and encoding shows significantly stronger resilience in the face of the simulated turbulence. Even with moderate turbulence, using the vector analysis of this disclosure results in significantly correct differential spatial phase shift keying decoding operations. High levels of spatial encoding (up to level 18 as shown in the appendix) are possible for efficient decoding according to the systems and methods implemented herein.

Figure 8:
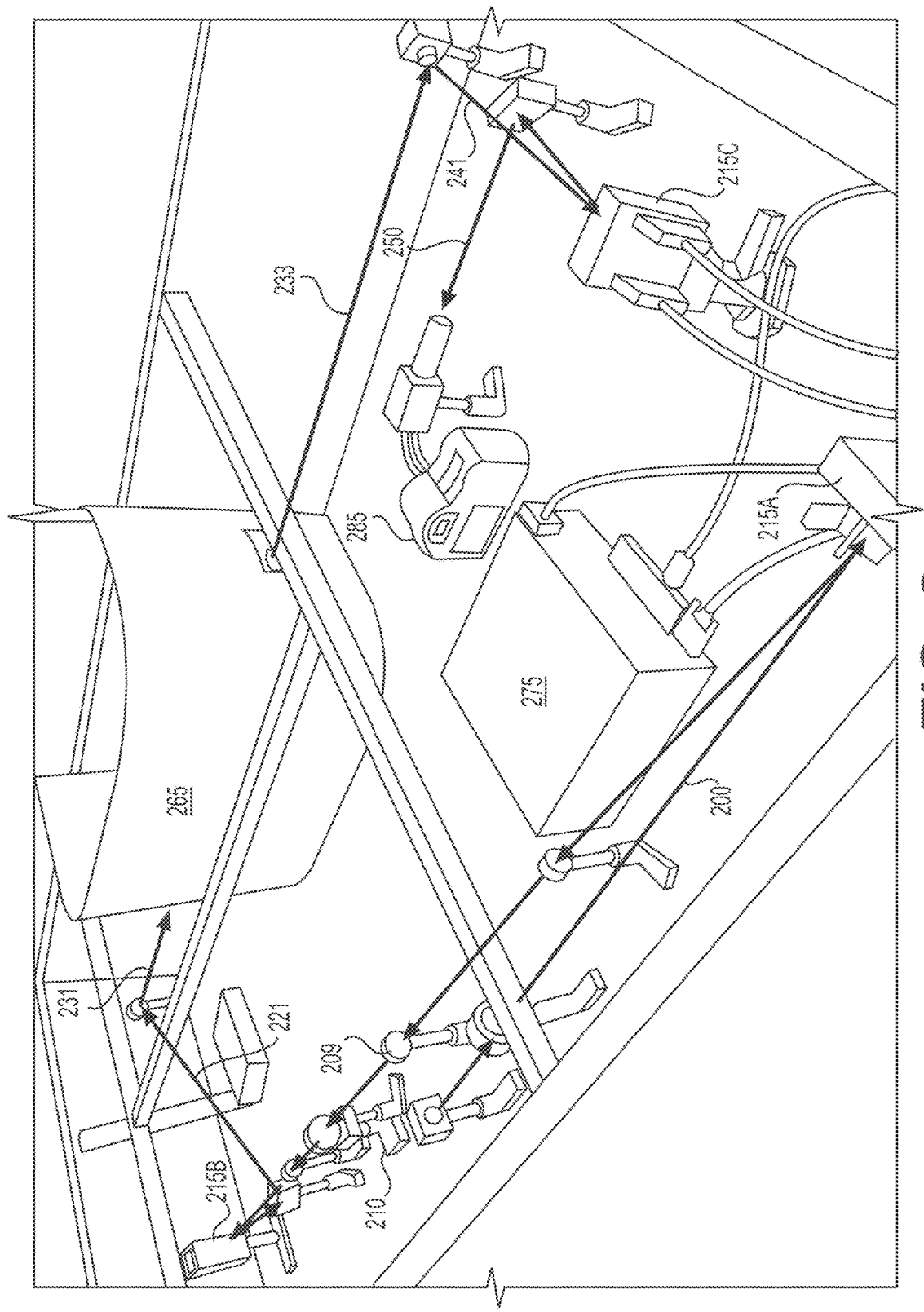
FIG. 8 is an example of optical equipment set up for differential spatial phase shift keying (DSPSK) encoding according to this disclosure.

In one non-limiting embodiment, equipment for this disclosure includes the set-up shown in FIG. 8 for example. A computerized method of transmitting information via an optical vector beam (250) starts with encoding the data onto a primary optical beam (200) to eventually form the optical vector beam (250), wherein the encoding comprises differential spatial phase shift keying (DSPSK) in which the data is represented by physical changes in the optical vector beam (250) across spatially separated portions of the optical vector beam field. Decoding the data is accomplished by identifying respective polarization states (310, 320, 330) and respective phase measurements for the spatially separated portions of the optical vector beam. Identifying the data in the optical vector beam includes tracking differences between the respective directional intensity complex amplitudes for the at least two polarized portions of the optical vector beam (250). As illustrated in FIG. 2, the signal bearing the information can be characterized by the difference between two directional intensity values selected from horizontal complex intensity amplitude (Ih), vertical complex intensity amplitude (Iv), diagonal complex intensity amplitude (Id), and anti-diagonal complex intensity amplitude (Ia). The diagonal and anti-diagonal amplitudes are used to express amplitudes that cross each other in the directions that span opposite directions across the optical field (i.e., the letter X has a diagonal component as one leg of the letter and an anti-directional component as the other leg).

In operation, the equipment shown in FIG. 8, a photon source (210) emits an original optical beam (200) which is received by at least one spatial light modulator (SLM) (215A) for a first level of encoding with any one of the available input modes (217A, 217B, 217C) shown in FIG. 2. As shown in FIG. 2, the SLMs of the equipment, along with various reflectors, plates, and other optical components (not numbered) apply selected polarization and/or phase adjustments to the original optical signal. In the set-up of FIG. 8, more than one polarization input mode can be established by multiplexing signals with numerous SLMs (215B, 215C), so long as a corresponding polarizing beam splitter (PBS) is available at a receiving end for de-multiplexing operations as shown in FIG. 3A and FIG. 3B. For testing purposes, a turbulence cell (265) also received incoming optical signal(s). Ultimately, the encoded optical vector beam reaches a polarizing imaging apparatus such as the camera (285) shown for example in FIG. 8. A computer encompassing micro-processing capabilities is in electronic communication with the camera (285) for decoding operations as set forth in FIGS. 2 and 3 for single mode transmission and higher order modes respectively. The apparatus of FIG. 8 could encode a single selected input mode by appropriate configuration of the SLMs (215A, 215B, 215C) to accomplish single input mode operation. A different configuration of the SLMs can accomplish a higher dimension transmission for decoding according to FIG. 3 with respectively incorporating polarizing beam splitting operations.

Figure 9:
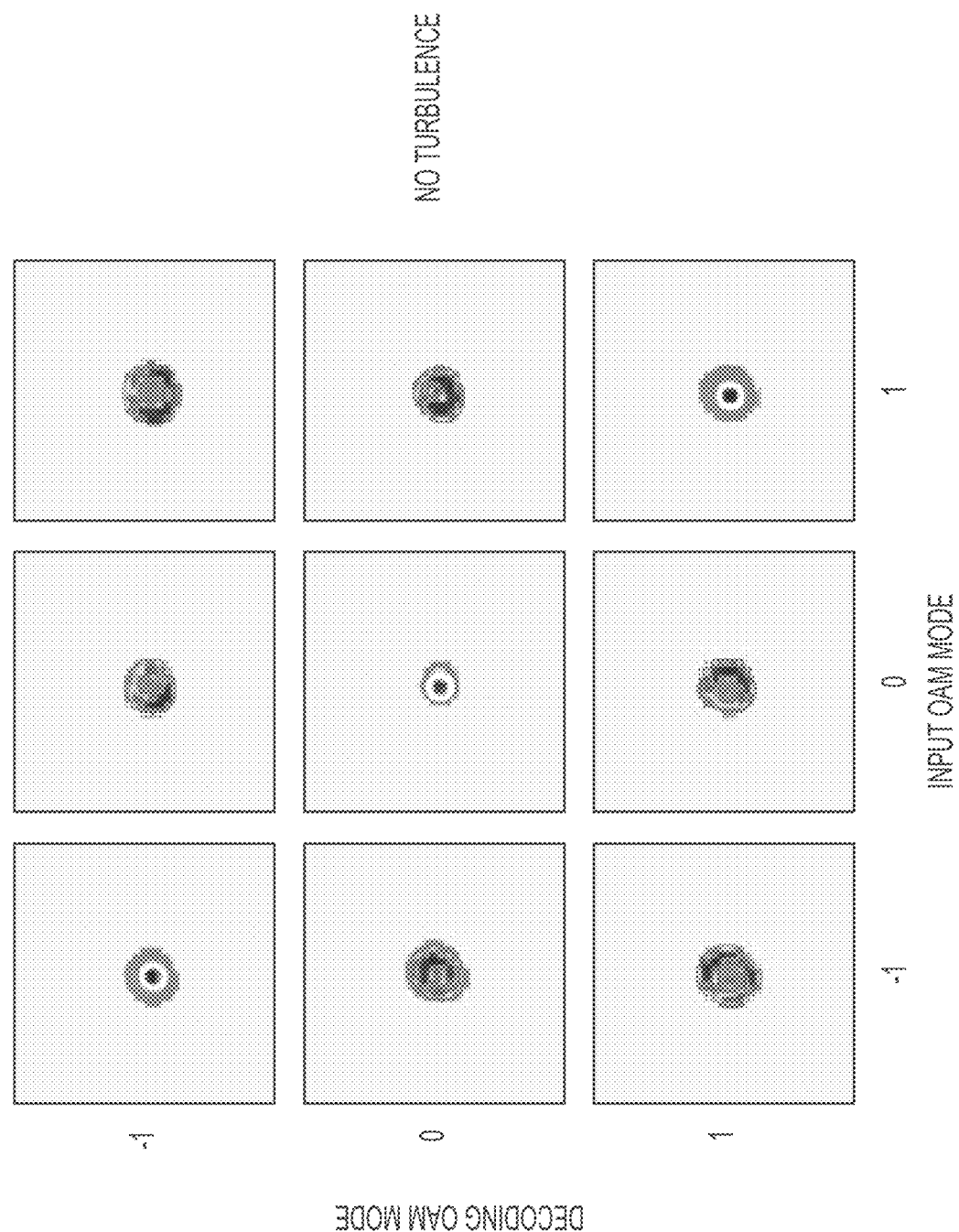
FIG. 9 is a schematic diagram showing full orbital angular momentum (OAM) encoding beams according to this disclosure.

In examples shown in the figures of this disclosure, the DSPSK techniques are compared to other orbital angular momentum encoding described above. To detect an OAM (L) beam, as shown in FIG. 9, one applies and OAM (−L) phase on the SLM and takes an image at the focal plane. At the center of the focal plane, a bright spot appears if the input beam is in OAM(L) mode or void otherwise. This technique has been used to show efficiency and accuracy of the DSPSK operations also described above.

Figure 10B:
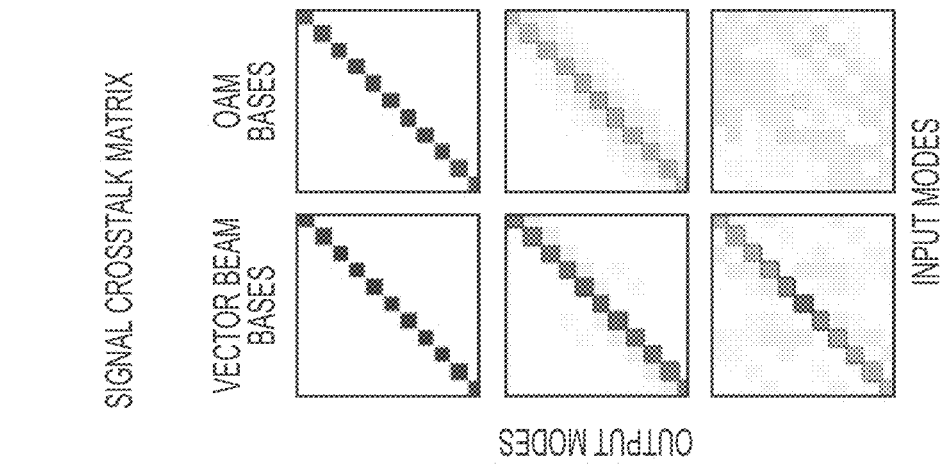
FIG. 10B is a signal cross talk matrix of outputs from the corresponding beams of FIG. 10A.
Figure 10A:
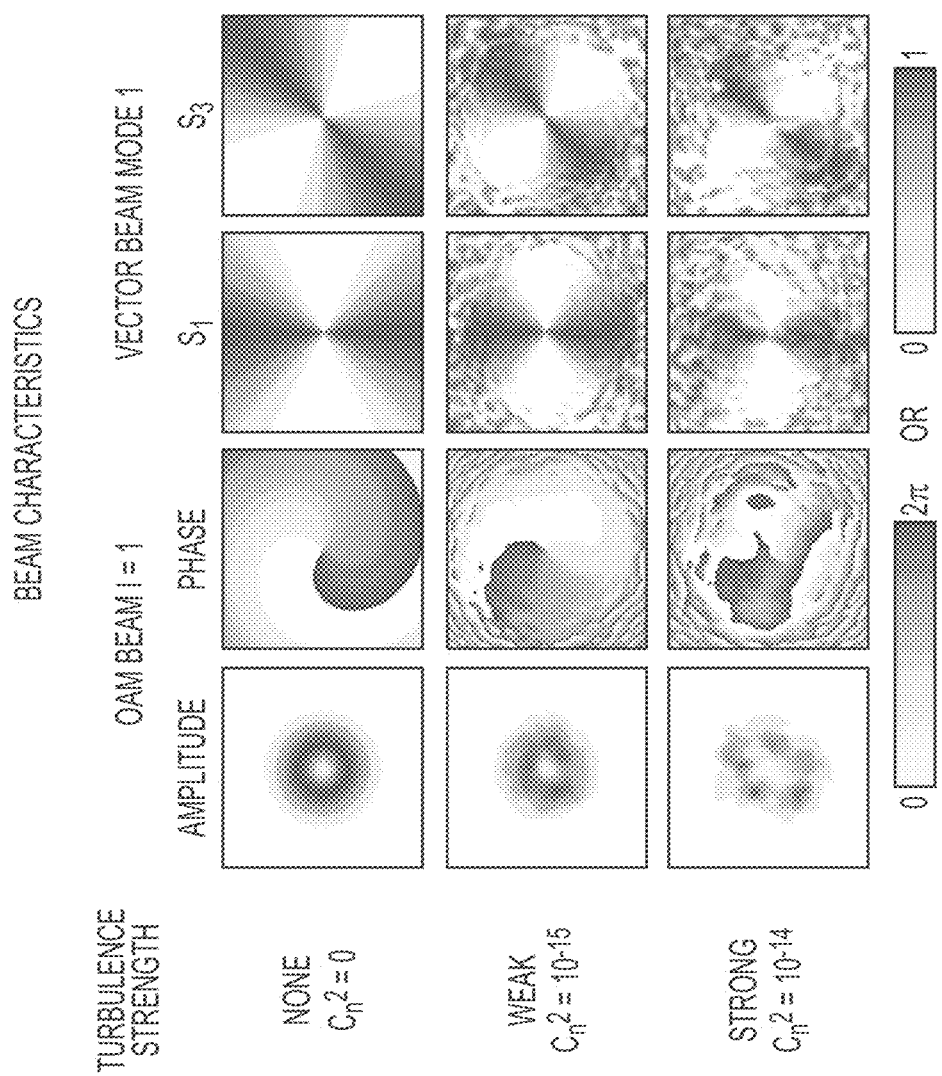
FIG. 10A is a schematic diagram comparing OAM and DSPSK beam characteristics in the presence of varied turbulence strength according to this disclosure.
Figure 13:
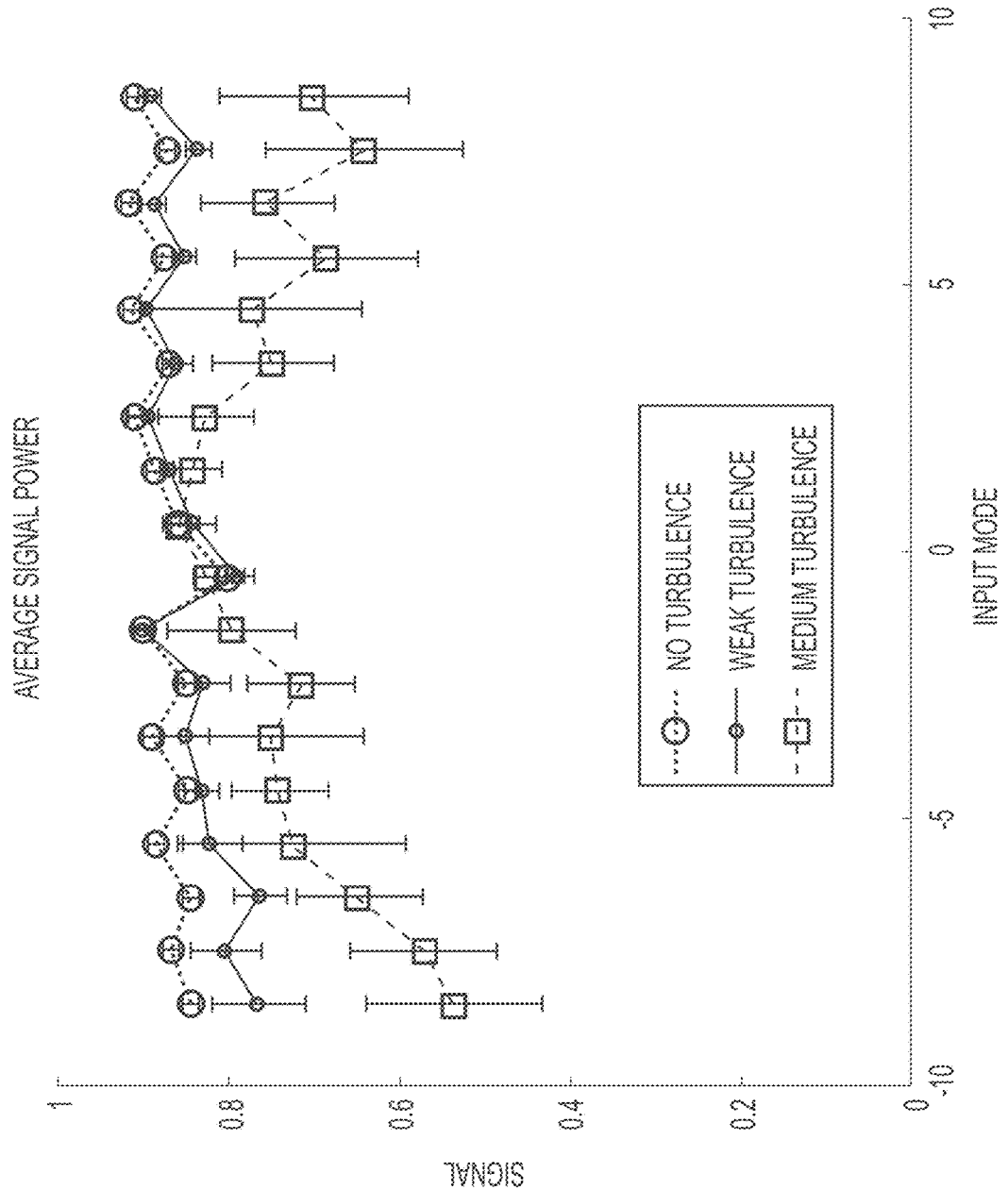
FIG. 13 is a schematic representation of a vector beam signal power with a DSPSK scheme of encoding according to this disclosure.
Figure 14:
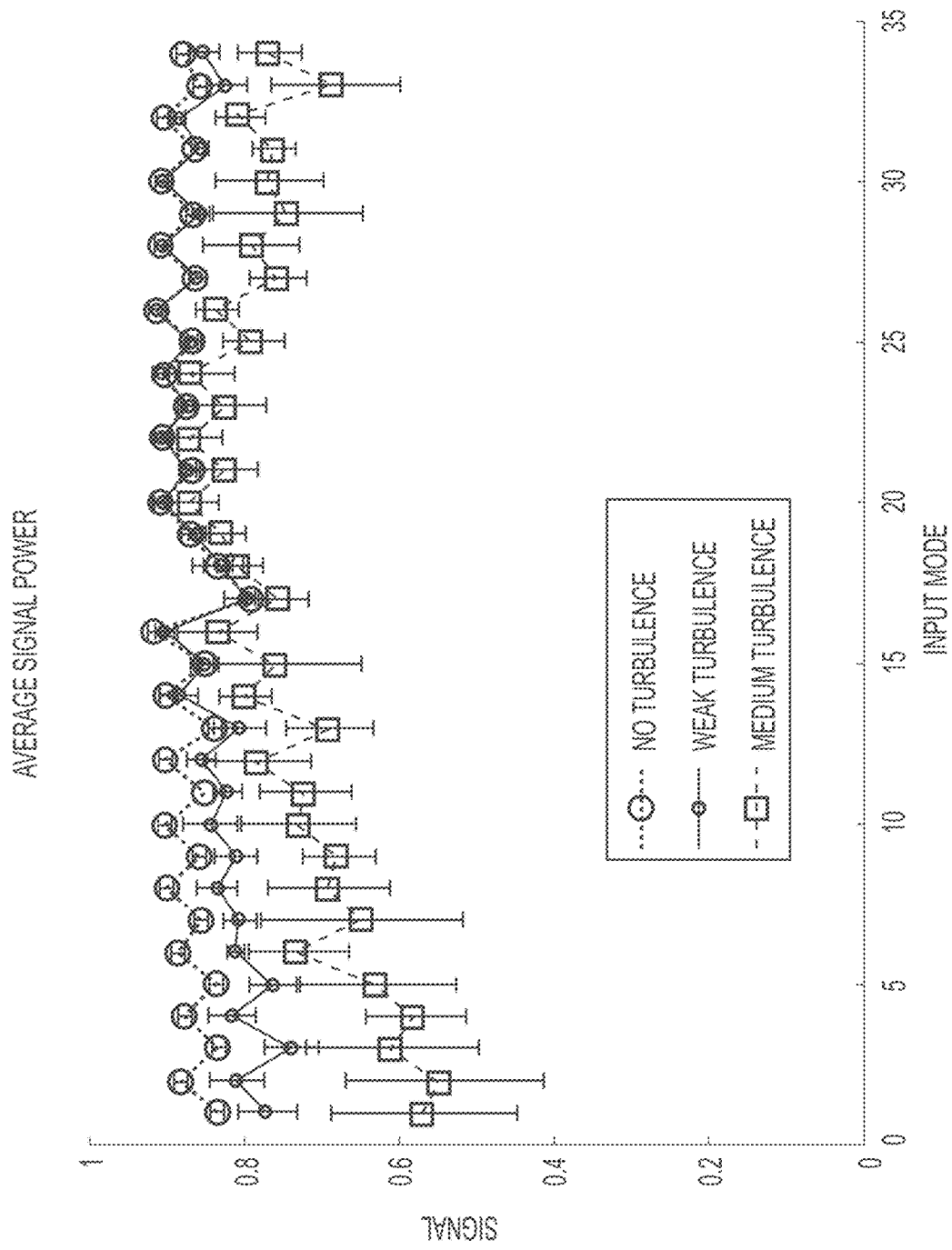
FIG. 14 is a schematic representation of a vector beam signal power with a DSPSK scheme of encoding according to this disclosure.

FIG. 10A and FIG. 10B illustrate a comparison of the accuracies inherent in the DSPSK embodiments utilizing either single or multiplexed input modes for encoding (FIG. 1) and decoding (FIGS. 2 and 3, respectively). The DSPSK results for Stokes parameters as shown illustrate significant improvement over OAM encoding even in the presence of strong turbulence. FIGS. 11A-11D illustrate the DSPSK efficacies at the higher level encoding modes (11 (FIG. 11A), 12 (FIG. 11C), 17 (FIG. 11B), 18 (FIG. 11D)) by which high dimension encoding has been used in terms of directional complex intensity amplitudes and phases. FIGS. 12A, 12B, 12C, 13, 14 illustrate the respective signal strengths at higher dimensional encoding operations even in the presence of different levels of turbulence. Finally, FIGS. 15A, 15B, and 15C show the possibilities inherent in asymmetric coding using different forms of directional intensity manipulation among the available horizontal, vertical, diagonal, and anti-diagonal kinds of directional intensities possible according to this disclosure. In the example of FIG. 15 the encoding is accomplished with dual encoding in the intensity domain via Iv and Id across different levels of turbulence. The figures illustrate that encoding across polarization states, phase status, and directional intensity amplitudes holds up well in different levels of turbulence as shown.

Publications cited herein are hereby specifically by reference in their entireties and at least for the material for which they are cited.

It should be understood that while the present disclosure has been provided in detail with respect to certain illustrative and specific aspects thereof, it should not be considered limited to such, as numerous modifications are possible without departing from the broad spirit and scope of the present disclosure as defined in the appended claims. It is, therefore, intended that the appended claims cover all such equivalent variations as fall within the true spirit and scope of the invention.

The present disclosure has been described with reference to example embodiments, however persons skilled in the art will recognize that changes may be made in form and detail without departing from the spirit and scope of the disclosed subject matter. For example, although different example embodiments may have been described as including one or more features providing one or more benefits, it is contemplated that the described features may be interchanged with one another or alternatively be combined with one another in the described example embodiments or in other alternative embodiments. Because the technology of the present disclosure is relatively complex, not all changes in the technology are foreseeable. The present disclosure described with reference to the exemplary embodiments is manifestly intended to be as broad as possible. For example, unless specifically otherwise noted, the exemplary embodiments reciting a single particular element also encompass a plurality of such particular elements.

Exemplary embodiments may include program products comprising computer or machine-readable media for carrying or having machine-executable instructions or data structures stored thereon. For example, the sensing electrode may be computer driven. Exemplary embodiments illustrated in the methods of the figures may be controlled by program products comprising computer or machine-readable media for carrying or having machine-executable instructions or data structures stored thereon. Such computer or machine-readable media can be any available media which can be accessed by a general purpose or special purpose computer or other machine with a processor. By way of example, such computer or machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of computer or machine-readable media. Computer or machine-executable instructions comprise, for example, instructions and data which cause a general purpose computer, special purpose computer, or special purpose processing machines to perform a certain function or group of functions. Software implementations of the present disclosure could be accomplished with standard programming techniques with rule based logic and other logic to accomplish the various connection steps, processing steps, comparison steps and decision steps.

It is also important to note that the construction and arrangement of the elements of the system as shown in the preferred and other exemplary embodiments is illustrative only. Although only a certain number of embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the assemblies may be reversed or otherwise varied, the length or width of the structures and/or members or connectors or other elements of the system may be varied, the nature or number of adjustment or attachment positions provided between the elements may be varied. It should be noted that the elements and/or assemblies of the system may be constructed from any of a wide variety of materials that provide sufficient strength or durability. Accordingly, all such modifications are intended to be included within the scope of the present disclosure. The order or sequence of any process or method steps may be varied or re-sequenced according to alternative embodiments. Other substitutions, modifications, changes and omissions may be made in the design, operating conditions and arrangement of the preferred and other exemplary embodiments without departing from the spirit of the present subject matter.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described herein with reference to block diagrams and flowchart illustrations of methods, systems, apparatuses and computer program products. It will be understood that each block of the block diagram and flowchart illustration can be implemented by computer program instructions. These computer program instructions may be loaded onto a general-purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagram and flowchart illustration support combinations of means for performing the specified functions, combinations of steps for performing the specified functions and program instruction means for performing the specified functions. It will also be understood that each block of the block diagram and flowchart illustration, and combinations of blocks in the block diagram and flowchart illustration, can be implemented by special purpose hardware-based computer systems that perform the specified functions or steps, or combinations of special purpose hardware and computer instructions.

The figures present an overview of an embodiment of a computer readable medium for use with the methods disclosed herein. Results can be delivered to a gateway (remote computer via the Internet or satellite) for in graphical user interface format. The described system can be used with an algorithm, such as those disclosed herein.

As may be understood from the figures, in this implementation, the computer may include a processing unit that communicates with other elements. Also included in the computer readable medium may be an output device and an input device for receiving and displaying data. This display device/input device may be, for example, a keyboard or pointing device that is used in combination with a monitor. The computer system may further include at least one storage device, such as a hard disk drive, a floppy disk drive, a CD Rom drive, SD disk, optical disk drive, or the like for storing information on various computer-readable media, such as a hard disk, a removable magnetic disk, or a CD-ROM disk. As will be appreciated by one of ordinary skill in the art, each of these storage devices may be connected to the system bus by an appropriate interface. The storage devices and their associated computer-readable media may provide nonvolatile storage. It is important to note that the computer described above could be replaced by any other type of computer in the art. Such media include, for example, magnetic cassettes, flash memory cards and digital video disks.

Further comprising an embodiment of the system can be a network interface controller. One skilled in the art will appreciate that the systems and methods disclosed herein can be implemented via a gateway that comprises a general-purpose computing device in the form of a computing device or computer.

One or more of several possible types of bus structures can be used as well, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus, and all buses specified in this description can also be implemented over a wired or wireless network connection and each of the subsystems, including the processor, a mass storage device, an operating system, network interface controller, Input/Output Interface, and a display device, can be contained within one or more remote computing devices at physically separate locations, connected through buses of this form, in effect implementing a fully distributed system.

The computer typically comprises a variety of computer readable media. Exemplary readable media can be any available media that is accessible by the computer and comprises, for example and not meant to be limiting, both volatile and non-volatile media, removable and non-removable media. The system memory comprises computer readable media in the form of volatile memory, such as random access memory (RAM), and/or non-volatile memory, such as read only memory (ROM).

In another aspect, the computer can also comprise other removable/non-removable, volatile/non-volatile computer storage media. For example and not meant to be limiting, a mass storage device can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device, including by way of example, an operating system and computational software. Each of the operating system and computational software (or some combination thereof) can comprise elements of the programming and the computational software. Data can also be stored on the mass storage device. Data can also be stored in any of one or more databases known in the art. Examples of such databases comprise, DB2™, MICROSOFT™ ACCESS, MICROSOFT™ SQL Server, ORACLE™, mySQL, PostgreSQL, and the like. The databases can be centralized or distributed across multiple systems.

In another aspect, the user can enter commands and information into the computer 102 via an input device. Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the processing unit via a human machine interface that is coupled to the network interface controller, but can be connected by other interface and bus structures, such as a parallel port, game port, an IEEE 1394 Port (also known as a Firewire port), a serial port, or a universal serial bus (USB).

In yet another aspect, a display device can also be connected to the system bus via an interface, such as a display adapter. It is contemplated that the computer can have more than one display adapter and the computer can have more than one display device. For example, a display device can be a monitor, an LCD (Liquid Crystal Display), or a projector. In addition to the display device, other output peripheral devices can comprise components such as speakers and a printer which can be connected to the computer via Input/Output Interface. Any step and/or result of the methods can be output in any form to an output device. Such output can be any form of visual representation, including, but not limited to, textual, graphical, animation, audio, tactile, and the like.

The computer can operate in a networked environment. By way of example, a remote computing device can be a personal computer, portable computer, a server, a router, a network computer, a peer device, sensor node, or other common network node, and so on. Logical connections between the computer and a remote computing device can be made via a local area network (LAN), a general wide area network (WAN), or any other form of a network. Such network connections can be through a network adapter. A network adapter can be implemented in both wired and wireless environments. Such networking environments are conventional and commonplace in offices, enterprise-wide computer networks, intranets, and other networks such as the Internet.

Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems described herein can employ Artificial Intelligence techniques such as machine learning and iterative learning. Examples of such techniques include, but are not limited to, expert systems, case-based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

REFERENCES

1. Q. Than, "Cylindrical vector beams: from mathematical concepts to applications," Adv. Opt. Photon. 1, 1-57 (2009).
2. A. F. Abouraddy and K. C. Toussaint, "Three-dimensional polarization control in microscopy," Phys. Rev. Lett. 96, 153901 (2006).
3. Q. Than and J. R. Leger, "Focus shaping using cylindrical vector beams," Opt. Express 10, 324-331 (2002).
4. M. G. Donato, S. Vasi, R. Sayed, P. H. Jones, F. Bonaccorso, A. C. Ferrari, P. G. Gucciardi, and O. M. Maragó, "Optical trapping of nanotubes with cylindrical vector beams," Opt. Lett. 37, 3381-3383 (2012).
5. H. Rubinsztein-Dunlop, A. Forbes, M. V. Berry, M. R. Dennis, D. L. Andrews, M. Mansuripur, C. Denz, C. Alpmann, P. Banzer, T. Bauer, E. Karimi, L. Marrucci, M. Padgett, M. Ritsch-Marte, N. M. Litchinitser, N. P. Bigelow, C. Rosales-Guzmán, A. Belmonte, J. P. Tones, T. W., Neely, M. Baker, R. Gordon, A. B. Stilgoe, J. Romero, A. G. White, R. Fickler, A. E. Willner, G. Xie, B. McMorran, and A. M. Weiner, "Roadmap on structured light," J. Opt. 19, 013001 (2017).
6. M. Beresna, M. Gecevi˘ cius, and P. G. Kazansky, "Polarization sensitive elements fabricated by femtosecond laser nanostructuring of glass," Opt. Mater. Express 1, 783-795 (2011).
7. G. Milione, T. A. Nguyen, J. Leach, D. A. Nolan, and R. R. Alfano, "Using the nonseparability of vector beams to encode information for optical communication," Opt. Lett. 40, 4887-4890 (2015).
8. G. Milione, M. P. J. Lavery, H. Huang, Y. Ren, G. Xie, T. A. Nguyen, E. Karimi, L. Marrucci, D. A. Nolan, R. R. Alfano, and A. E. Willner, "4×20 gbit/s mode division multiplexing over free space using vector modes and a q-plate mode (de)multiplexer," Opt. Lett. 40, 1980-1983 (2015).
9. Y. Zhao and J. Wang, "High-base vector beam encoding/decoding for visible-light communications," Opt. Lett. 40, 4843-4846 (2015).
10. A. Sit, F. Bouchard, R. Fickler, J. Gagnon-Bischoff, H. Larocque, K. Heshami, D. Elser, C. Peuntinger, K. Giinthner, B. Heim, C. Marquardt, G. Leuchs, R. W. Boyd, and E. Karimi, "High-dimensional intracity quantum cryptography with structured photons," Optica 4, 1006-1010 (2017).
11. C. Maurer, A. Jesacher, S. Fürhapter, S. Bernet, and M. Ritsch-Marte, "Tailoring of arbitrary optical vector beams," New J Phys 9, 78 (2007).
12. X.-L. Wang, J. Ding, W.-J. Ni, C.-S. Guo, and H.-T. Wang, "Generation of arbitrary vector beams with a spatial light modulator and a common path interferometric arrangement," Opt. Lett. 32, 3549-3551 (2007).
13. L. Marrucci, C. Manzo, and D. Paparo, "Optical spin-to-orbital angular momentum conversion in inhomogeneous anisotropic media," Phys. Rev. Lett. 96, 163905 (2006).
14. S. Slussarenko, A. Murauski, T. Du, V. Chigrinov, L. Marrucci, and E. Santamato, "Tunable liquid crystal q-plates with arbitrary topological charge," Opt. Express 19, 4085-4090 (2011).
15. F. Cardano, E. Karimi, S. Slussarenko, L. Marrucci, C. de Lisio, and E. Santamato, "Polarization pattern of vector vortex beams generated by q-plates with different topological charges," Appl. Opt. 51, C1-C6 (2012).
16. G. Volpe and D. Petrov, "Generation of cylindrical vector beams with few-mode fibers excited by laguerre-gaussian beams," Opt. Commun. 237, 89-95 (2004).
17. S. Ramachandran, P. Kristensen, and M. F. Yan, "Generation and propagation of radially polarized beams in optical fibers," Opt. Lett. 34, 2525-2527 (2009).
18. Z. Zhao, J. Wang, S. Li, and A. E. Willner, "Metamaterials-based broadband generation of orbital angular momentum carrying vector beams," Opt. Lett. 38, 932-934 (2013).
19. A. Arbabi, Y. Horie, M. Bagheri, and A. Faraon, "Dielectric metasurfaces for complete control of phase and polarization with subwavelength spatial resolution and high transmission," Nat. Nanotechnol 10, 937-943 (2015).
20. J. S. Tyo, D. L. Goldstein, D. B. Chenault, and J. A. Shaw, "Review of passive imaging polarimetry for remote sensing applications," Appl. Opt. 45, 5453-5469 (2006).
21. B. Ndagano, I. Nape, B. Perez-Garcia, S. Scholes, R. I. Hernandez-Aranda, T. Konrad, M. P. Lavery, and A. Forbes, "A deterministic detector for vector vortex states," Sci. Rep. 7, 13882 (2017).
22. M. McLaren, T. Konrad, and A. Forbes, "Measuring the nonseparability of vector vortex beams," Phys. Rev. A 92, 023833 (2015).
23. D. Malacara, *Optical Shop Testing* (Wiley, New York, 1978).
24. J. Hartmann, "Bemerkungen´ 'uber den bau and die justirung von spektrographen," Zt. Instrumentenkd. 29, 47 (1900).
25. R. V. Shack and B. C. Platt, "Production and use of a lenticular Hartmann screen (abstract)," J. Opt. Soc. Am. 61, 656 (1971).
26. R. N. Smartt and J. Strong, "Point-diffraction interferometer (abstract)," J. Opt. Soc. Am. 62, 737 (1972).
27. K. L. Marshall, K. Adelsberger, G. Myhre, and D. W. Griffin, "The lcpdi-A compact and robust phase-shifting point-diffraction interferometer based on dye-doped lc technology," Molecular Crystals and Liquid Crystals 454, 23/[425]-45/[447] (2006).
28. R. M. Neal and J. C. Wyant, "Polarization phase-shifting point diffraction interferometer," Appl. Opt. 45, 3463-3476 (2006).
29. J. R. Fienup, "Phase retrieval algorithms: a comparison," Appl. Opt. 21, 2758-2769 (1982).

30. G. Sirat and D. Psaltis, "Conoscopic holography," Opt. Lett. 10, 4-6 (1985).
31. K. Buse and M. Luennemann, "3d imaging: Wave front sensing utilizing a birefringent crystal," Phys. Rev. Lett. 85, 3385-3387 (2000).
32. R. Ragazzoni, E. Marchetti, and F. Rigaut, "Modal tomography for adaptive optics," Astron. Astrophys. 342, L53-L56 (1999).
33. E. Wolf, "Solution of the phase problem in the theory of structure determination of crystals from x-ray diffraction experiments," Phys. Rev. Lett. 103, 075501 (2009).
34. J. S. Lundeen, B. Sutherland, A. Patel, C. Stewart, and C. Bamber, "Direct measurement of the quantum wavefunction," Nature 474, 188 (2011).
35. J. S. Lundeen and C. Bamber, "Procedure for direct measurement of general quantum states using weak measurement," Phys. Rev. Lett. 108, 070402 (2012).
36. S. Wu, "State tomography via weak measurements," Sci. Rep. 3, 1193 (2013).
37. M. Mirhosseini, O. S. Magaña Loaiza, S. M. Hashemi Rafsanjani, and R. W. Boyd, "Compressive direct measurement of the quantum wave function," Phys. Rev. Lett. 113, 090402 (2014).
38. J. Z. Salvail, M. Agnew, A. S. Johnson, E. Bolduc, J. Leach, and R. W. Boyd, "Full characterization of polarization states of light via direct measurement," Nat. Photonics 7, 316-321 (2013).
39. M. Malik, M. Mirhosseini, M. P. Lavery, J. Leach, M. J. Padgett, and R. W. Boyd, "Direct measurement of a 27-dimensional orbital-angularmomentum state vector," Nat. Commun. 5, 3115 (2014).
40. Z. Shi, M. Mirhosseini, J. Margiewicz, M. Malik, F. Rivera, Z. Zhu, and R. W. Boyd, "Scan-free direct measurement of an extremely high dimensional photonic state," Optica 2, 388-392 (2015).
41. B. Perez-Garcia, C. López-Mariscal, R. I. Hernandez-Aranda, and J. C. Gutiérrez-Vega, "On-demand tailored vector beams," Appl. Opt. 56, 6967-6972 (2017).
42. J. A. Davis, D. M. Cottrell, J. Campos, M. J. Yzuel, and I. Moreno, "Encoding amplitude information onto phase-only filters," Appl. Opt. 38, 5004-5013 (1999).
43. V. Arrizón, U. Ruiz, R. Canada, and L. A. González, "Pixelated phase computer holograms for the accurate encoding of scalar complex fields," J. Opt. Soc. Amer. A 24, 3500-3507 (2007).
44. Q. Zhan, "Cylindrical vector beams: from mathematical concepts to applications," Adv. Opt. Photon. 1, 1-57 (2009).
45. A. M. Beckley, T. G. Brown, and M. A. Alonso, "Full poincaré beams," Opt. Express 18, 10777-10785 (2010).

It should be understood that while the present disclosure has been provided in detail with respect to certain illustrative and specific aspects thereof, it should not be considered limited to such, as numerous modifications are possible without departing from the broad spirit and scope of the present disclosure as defined in the appended claims. It is, therefore, intended that the appended claims cover all such equivalent variations as fall within the true spirit and scope of the invention.

What is claimed is:

1. A computerized method of transmitting information via an optical vector beam, the method comprising:
   encoding the data onto a primary optical beam to form the optical vector beam, wherein the encoding comprises differential spatial phase shift keying (DSPSK) in which the data is represented by physical changes in the optical vector beam across spatially separated portions of the optical vector beam;
   decoding the data by identifying respective directional complex intensity amplitudes, polarization states and respective phase measurements for the spatially separated portions of the optical vector beam by:
   (i) selecting, from the spatially separated portions of the optical vector beam, at least two orthogonally polarized portions of the optical vector beam; and
   (ii) identifying the data in the optical vector beam by tracking differences between the respective directional intensity complex amplitudes for the at least two orthogonally polarized of the optical vector beam.

2. The computerized method of claim 1, wherein encoding the data onto the primary optical beam comprises:
   directing the primary optical beam to at least one of a first spatial light modulator, a second spatial light modulator, and a third spatial light modulator.

3. The computerized method of claim 2, wherein encoding the data onto the primary optical beam comprises encoding with a single selected input mode having a selected directional intensity complex amplitude.

4. The computerized method of claim 3, wherein encoding the data onto the primary optical beam comprises encoding with a multi-dimensional input mode.

* * * * *